United States Patent
Goto et al.

(10) Patent No.: US 8,299,997 B2
(45) Date of Patent: Oct. 30, 2012

(54) LIQUID CRYSTAL DISPLAY DEVICE

(75) Inventors: Mitsuru Goto, Chiba (JP); Hiroko Hayata, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 715 days.

(21) Appl. No.: 12/129,776

(22) Filed: May 30, 2008

(65) Prior Publication Data
US 2008/0231573 A1 Sep. 25, 2008

Related U.S. Application Data

(63) Continuation of application No. 11/401,840, filed on Apr. 12, 2006, now abandoned, which is a continuation of application No. 09/905,911, filed on Jul. 17, 2001, now Pat. No. 7,034,810.

(30) Foreign Application Priority Data

Jul. 25, 2000 (JP) ................................. 2000-223942

(51) Int. Cl.
G09G 3/36 (2006.01)
(52) U.S. Cl. ............... 345/92; 345/204; 345/87; 257/72
(58) Field of Classification Search .................. 345/204, 345/87, 92; 257/72
See application file for complete search history.

(56) References Cited

U.S. PATENT DOCUMENTS

| | | | |
|---|---|---|---|
| 5,608,559 A * | 3/1997 | Inada et al. | 349/149 |
| 5,737,272 A * | 4/1998 | Uchiyama et al. | 345/206 |
| 5,798,744 A * | 8/1998 | Tanaka et al. | 345/92 |
| 5,844,314 A | 12/1998 | Kim | |
| 5,945,984 A | 8/1999 | Kawashiro | |
| 6,128,063 A * | 10/2000 | Uchiyama et al. | 349/150 |
| 6,198,522 B1 | 3/2001 | Yanagi | |
| 6,229,513 B1 | 5/2001 | Nakano | |
| 6,232,941 B1 | 5/2001 | Ode | |
| 6,323,930 B1 | 11/2001 | Higuchi | |
| 6,433,842 B1 * | 8/2002 | Kaneko et al. | 349/43 |
| 6,437,764 B1 * | 8/2002 | Suzuki et al. | 345/87 |
| 6,448,663 B1 | 9/2002 | Uchiyama | |
| 6,587,162 B1 * | 7/2003 | Kaneko et al. | 349/43 |
| 6,603,527 B1 | 8/2003 | Hayata | |
| 6,611,261 B1 | 8/2003 | Zhang | |
| 6,676,763 B2 * | 1/2004 | Johnson et al. | 134/1 |

(Continued)

FOREIGN PATENT DOCUMENTS

JP 64-070727 3/1989

(Continued)

Primary Examiner — Bipin Shalwala
Assistant Examiner — Afroza Chowdhury
(74) Attorney, Agent, or Firm — Antonelli, Terry, Stout & Kraus, LLP.

(57) ABSTRACT

A display device includes a TFT substrate with gate signal lines, drain signal lines, thin-film transistors connected thereto, a gate driver connected to the gate signal lines, a drain driver having output terminals connected to drain signal lines, and a film substrate having first wirings. The first wirings are disposed between the drain driver and the film substrate. The drain driver is mounted on the film substrate, and the output terminals are connected to the first wirings between the film substrate and the drain driver. The output terminal includes first group terminals formed in parallel with a longer edge of the drain driver, and second group terminals formed in parallel with the longer edge and disposed between the loner edge and the first group terminals.

11 Claims, 20 Drawing Sheets

U.S. PATENT DOCUMENTS

| | | | | |
|---|---|---|---|---|
| 6,680,577 B1 * | 1/2004 | Inukai et al. | ............... | 315/169.3 |
| 6,697,040 B2 * | 2/2004 | Imajo et al. | .................... | 345/98 |
| 6,741,315 B1 * | 5/2004 | Uchiyama | .................... | 349/149 |
| 6,806,862 B1 * | 10/2004 | Zhang et al. | .................. | 345/103 |
| 6,825,826 B1 * | 11/2004 | Mikami et al. | .................. | 345/98 |
| 6,855,957 B1 * | 2/2005 | Yamazaki et al. | ............. | 257/72 |
| 6,882,012 B2 * | 4/2005 | Yamazaki et al. | ............. | 257/359 |
| 6,900,855 B1 * | 5/2005 | Yamazaki et al. | ............. | 349/44 |
| 6,922,226 B2 * | 7/2005 | Park et al. | .................... | 349/149 |
| 6,992,651 B1 * | 1/2006 | Koyama et al. | ................. | 345/92 |
| 7,102,718 B1 * | 9/2006 | Yamazaki et al. | ............ | 349/141 |
| 7,403,184 B1 * | 7/2008 | Moon | ............................. | 345/99 |
| 7,420,821 B2 * | 9/2008 | Sakaki | .......................... | 361/803 |
| 7,714,975 B1 * | 5/2010 | Yamazaki et al. | ............. | 349/155 |

FOREIGN PATENT DOCUMENTS

| | | |
|---|---|---|
| JP | 7-120772 | 5/1995 |
| JP | 8-201841 | 8/1996 |
| JP | 09-244051 | 9/1997 |
| JP | 09-281930 | 10/1997 |
| JP | 11-85092 | 3/1999 |
| JP | 11-183922 | 7/1999 |
| JP | 11-261238 | 9/1999 |
| JP | 11-274232 | 10/1999 |
| JP | 2000-111939 | 4/2000 |
| KR | 1998-048656 | 9/1998 |

* cited by examiner

FIG. 4

Frame of an Odd Number

1 ●○●○●○●○●○●○· · · · · ·
2 ○●○●○●○●○●○· · · · · ·
3 ●○●○●○●○●○●○· · · · · ·
4 ○●○●○●○●○●○· · · · · ·
5 ●○●○●○●○●○●○· · · · · ·
6 ○●○●○○●○●○●○· · · · · ·

Frame of an Even Number

1 ○●○●○●○●○●○· · · · · ·
2 ●○●○●○●○●○●· · · · · ·
3 ○●○●○●○●○●○· · · · · ·
4 ●○●○●○●○●○●· · · · · ·
5 ○●○●○●○●○●○· · · · · ·
6 ●○●○●○●○●○●· · · · · ·

LIQUID CRYSTAL DISPLAY DEVICE

CROSS REFERENCE TO RELATED APPLICATION

This application is a continuation application of U.S. application Ser. No. 11/401,840, filed Apr. 12, 2006 now abandoned, which is a continuation application of U.S. application Ser. No. 09/905,911, filed Jul. 17, 2001, now U.S. Pat. No. 7,034,810, the contents of which are incorporated herein by reference.

BACKGROUND OF THE INVENTION

1. Field of the Invention

The present invention relates in general to liquid crystal display devices and, in more particular, to a technique usefully applicable to an image signal drive unit (drain driver or drivers) of a liquid crystal display device with multilevel gradation/tone display abilities.

2. Description of the Related Art

Liquid crystal display devices of the active matrix type having an active element (e.g. thin-film transistor) on a per-pixel basis and driving this active element to perform a switching operation have widely been employed as the display device of a notebook personal computer or the like.

These active-matrix liquid crystal display (AMLCD) devices are such that due to application of an image signal voltage (gradation/tone voltage corresponding to display data, as will be referred to as gradation/tone voltage hereinafter) to a pixel electrode via such active element, any crosstalk is absent between respective pixels and thus, it is no longer necessary to employ "special" driving methods for prevention of crosstalk unlike simple-matrix liquid crystal display devices, thereby enabling successful achievement of multi-gradation-level or "gray-scale" display abilities.

As one of the active-matrix liquid crystal display devices, there is known a TFT liquid crystal display module, which comprises a liquid crystal display panel of the thin-film transistor (TFT) scheme, also called TFT-LCD panel, drain drivers as disposed on the upper side of the liquid crystal display panel, and gate drivers and an interface section as disposed along side faces of the liquid crystal display panel.

FIG. 24 is a block diagram showing a schematic configuration of one example of related art TFT liquid crystal display module.

As shown in FIG. 24, a plurality of drain drivers 130 are disposed along a long edge side of the liquid crystal display panel (TFT-LCD) 10 whereas a plurality of gate drivers 140 are laid out along a short edge side of the liquid crystal display panel 10.

Control signals that are output from a host computer side such as a personal computer and consist essentially of display data (image signal) of three primary colors of red (R), green (G) and blue (B), a clock signal(s), a display timing signal(s), and synchronization signals (horizontal sync signal and vertical sync signal) are input to a display control device (TFT controller) 110 via an interface connector.

A control signal(s) and display data and the like from the display control device 110 are input to each drain driver 130 via a TFT controller substrate 301 and drain driver substrate 302.

In addition, the control signal(s) from the display control device 110 will be input to each gate driver 140 through the TFT controller substrate 301 and a gate driver substrate 303.

Note that depiction of a wiring layer(s) on or over the TFT controller substrate is eliminated in FIG. 24.

Also note that although more than one wiring layer other than the wiring layer shown in FIG. 24 is also provided on the drain driver substrate and gate driver substrate, only four lines of wiring layers for the drain driver substrate 302 and only two lines of wiring layers for the gate driver substrate 303 are depicted in FIG. 24.

The drain drivers 130 and gate drivers 140 are constituted from semiconductor chips (ICs), wherein these semiconductor chips (ICs) are mounted on a film substrate by either the so-called tape carrier techniques or chip-on-film techniques.

As shown in FIG. 25 a wiring layer (COFA) is formed on the film substrate 310 from the periphery, wherein terminals (BUMP) being provided at the periphery of semiconductor chip (IC) are coupled by bonding to this wiring layer (COFA).

Here, drain driver terminals (BUMP) are typically provided along the peripheral portions thereof, one example of which is shown in FIG. 26.

As shown in FIG. 26, input terminals (BUMP2) are disposed along one side for enabling connection of wiring leads from the drain driver substrate 302 whereas output terminals (BUMP1) are disposed at either the remaining three sides or four peripheral portions including right and left spaces of a side along which the input terminals (BUMP2) are disposed.

Additionally output circuits 330 within the drain drivers corresponding to respective output terminals (BUMP1) are typically laid out into a linear array in a way identical to output terminal positions.

Note that such liquid crystal display device has been recited, for example, in Japanese Patent Laid-Open No. 281930/1997.

In recent years, in liquid crystal display devices such as TFT liquid crystal display modules, with the increasing demand for larger display screen sizes of liquid crystal display panels, they are in the tendency toward increase in pixel number of a liquid crystal display panel and also requirement for achievement of higher precision; and, in accordance therewith, gate signal lines and drain signal lines also increase in number resulting in a likewise increase in input/output terminal number of the drain drivers.

For instance, with an XGA-format liquid crystal display panel, the requisite number of drain signal lines is 3,072 (=1,024×3 (RGB)). Assuming that drain drivers with 384 output terminals are used, the required number of drain drivers in the XGA-LCD panel becomes as large as 8 (=3,072/384).

In contrast, with the quest for higher precision further advances up to UXGA specifications, the resultant number of drain signal lines is 4,800 (=1,600×3 (RGB)). As in the previous case, supposing that drain drivers with the 384 output terminal number are used, the required drain driver number in UXGA-LCD panels becomes 12.5 (=4,800/384).

In this way, the higher the precision of liquid crystal display panels, the greater the drain line number per liquid crystal display panel, resulting in an increase in number of drain drivers required.

Whereby the resulting load capacitance of the display control device 110 increases accordingly, resulting in occurrence of a problem as to an incapability to drive the drain drivers 130.

In order to prevent the number of drain drivers from changing even when a liquid crystal display panel increases in precision, it should be required to increase the output terminal number per drain driver.

Generally, semiconductor chips (ICs) making up the drain drivers are such that the outer shape thereof is like a laterally elongated plate shape, wherein if output terminals (BUMP)

per drain driver increase in number then it becomes necessary to increase the length of a semiconductor chip (IC) along its lateral direction.

In addition, while semiconductor chips (ICs) are fabricated by cutaway processes after having formed a plurality of ones on a single semiconductor wafer, the greater the lateral directional length of semiconductor chips (ICs) with a further increased length in lateral direction thereof, the less the number of chips obtainable from a single wafer, resulting in an undesirable increase in price of a single semiconductor chip (IC).

Further, with laterally lengthened semiconductor chips (ICs) with a further increased length in the lateral direction thereof, there is an anxiety that excessive increase beyond the exposure range can take place when forming semiconductor chips (ICs) through the so-called step-and-repeat exposure process on the surface of a single semiconductor wafer.

To avoid this, it will be required to make use of exposure apparatus of high price, resulting in an increase in price of a single semiconductor chip (IC).

On the other hand, while liquid crystal display devices are under strict requirement for lower prices, there is a problem that the higher the semiconductor chip (IC) making up the drain driver 130, the higher the price of a liquid crystal display device.

In addition, with an increase in drain signal lines, there is a tendency to inevitable increase in pitch of the output terminals (BUMP1) of drain drivers 130; thus, there is a problem that probing becomes difficult during screening of semiconductor chips (ICs).

Furthermore, with such increase in drain signal lines, the circuit scale of a single drain driver 130 tends to grow larger; thus, there is a problem that a voltage drop-down due to the presence of wiring lead impedances within semiconductor chip (IC) becomes no longer negligible.

SUMMARY OF THE INVENTION

The invention was made in order to avoid the problems faced with the related art, and a primary object of the invention is to provide a technique capable of sufficiently handling or coping with any increases in pixel number of a liquid crystal display element in the liquid crystal display device while at the same time enabling achievement of a low price.

It is another object of the invention to provide a technique adaptable for use in a liquid crystal display device for enabling simplified execution of test/inspection procedures even when the output terminal number of a semiconductor integrated circuit device of an image line drive unit increases.

It is still another object of the invention to provide a technique in the liquid crystal display device for enabling prevention of any possible voltage dropdown otherwise occurring due to a wiring layer(s) within a semiconductor integrated circuit device even when the output terminal number of the semiconductor integrated circuit device of image line drive unit increases.

These objects and new features of the invention will become apparent from the description of the specification and the accompanying drawings.

A summary of representative ones of the inventions as disclosed herein will be explained in brief below.

To be brief, the invention is concerned with a liquid crystal display device which comprises a liquid crystal display element having a plurality of pixels and a plurality of image signal lines for applying a gradation/tone voltage corresponding to display data to the plurality of pixels and image signal line drive unit for supplying to each the image signal line a gradation/tone voltage corresponding to display data, wherein the image line drive unit has more than one semiconductor integrated circuit device, and the semiconductor integrated circuit device has a first output terminal section which is provided for example at a central portion in a short side direction of the semiconductor integrated circuit device and also in a longitudinal direction of the semiconductor integrated circuit device, and a pair of output circuit units provided on both sides of the first output terminal section in a short side direction of the semiconductor integrated circuit device for generating a gradation/tone voltage to be supplied to each image signal line.

In addition, the invention is concerned with a liquid crystal display device which comprises a liquid crystal display element having a plurality of pixels and a plurality of image signal lines for applying a gradation/tone voltage corresponding to display data to the plurality of pixels and image signal line drive unit for supplying to each image signal line a gradation/tone voltage corresponding to display data, wherein the image line drive unit has a plurality of semiconductor integrated circuit devices, and each semiconductor integrated circuit device has an input circuit unit as provided in a short side direction of the semiconductor integrated circuit device, a first output terminal section provided on both sides of the input circuit unit in a longitudinal direction of the semiconductor integrated circuit device and also provided in the longitudinal direction of the semiconductor integrated circuit device, and a pair of output circuit units provided on both sides of the first output terminal section in the short side direction of the semiconductor integrated circuit device, for generating a gradation/tone voltage to be supplied to each image signal line.

Additionally, according to one preferred form of the invention, in a region other than the first output terminal section and the output circuit unit, is provided a second output terminal section as provided along a peripheral portion of two short sides of at least the semiconductor integrated circuit device.

In addition, according to one preferred form of the invention, the pair of output circuit units are such that a positive polarity output circuit unit for generation of a positive gradation/tone voltage and a negative polarity output circuit unit for generation of a negative gradation/tone voltage are provided alternately.

In addition, according to one preferred form of the invention, one output circuit unit of the pair of output circuit units is provided with a positive polarity output circuit unit for generation of a positive gradation/tone voltage, and a remaining output circuit unit of the pair of output circuit units is provided with a negative polarity output circuit unit for generation of a negative gradation/tone voltage.

In addition, according to one preferred form of the invention, the output circuit unit has a buffer circuit, a decoder circuit, a data latch circuit, and a shift register circuit, wherein the buffer circuit, decoder circuit, data latch circuit and shift register circuit are disposed from the first output terminal section toward the short side direction of the semiconductor integrated circuit device in an order of the buffer circuit, decoder circuit, data latch circuit and shift register circuit.

Additionally, the invention is concerned with a liquid crystal display device comprising a liquid crystal display element having a plurality of pixels and a plurality of image signal lines for applying a gradation/tone voltage corresponding to display data to the plurality of pixels and image signal line drive unit for supplying to each image signal line a gradation/tone voltage corresponding to display data, wherein the image line drive unit has a plurality of semiconductor integrated circuit devices, and each semiconductor integrated circuit device has an input circuit unit as provided in a short side direction of the semiconductor integrated circuit device, a plurality of output terminal sections provided on both sides of the input circuit unit in a longitudinal direction of the semiconductor integrated circuit device and also provided in the longitudinal direction of the semiconductor integrated circuit device, and a pair of output circuit units provided per each output terminal section on both sides of each output terminal section in the short side direction of the semiconductor integrated circuit device for generating a gradation/tone voltage to be supplied to each image signal line.

Additionally, the invention is concerned with a liquid crystal display device comprising a liquid crystal display element having a plurality of pixels and a plurality of image signal lines for applying a gradation/tone voltage corresponding to display data to the plurality of pixels and image signal line drive unit for supplying to each image signal line a gradation/tone voltage corresponding to display data, wherein the image line drive unit has a film substrate with a plurality of wiring layers formed thereover and more than one semiconductor integrated circuit device as mounted on the film substrate, the semiconductor integrated circuit device has in a region other than peripheral part of the semiconductor integrated circuit device a plurality of bump electrodes as provided in the longitudinal direction of the semiconductor integrated circuit device, and part of the wiring layers of the film substrate is connected at one end to each bump electrode of the semiconductor integrated circuit device and also provided to extend from the one end up to the peripheral part of the film substrate while letting part including the one end be covered by the semiconductor integrated circuit device.

Additionally, the invention is concerned with a liquid crystal display device comprising a liquid crystal display element having a pair of substrates and a liquid crystal layer interposed between the pair of substrates and also having a plurality of pixels and a plurality of image signal lines for application of a gradation/tone voltage corresponding to display data to the plurality of pixels of the liquid crystal layer, and an image signal drive unit for supplying a gradation/tone voltage corresponding to display data to each image signal line, wherein the image signal line drive unit has more than one semiconductor integrated circuit device as mounted on one substrate of the pair of substrates, the semiconductor integrated circuit device has in a region other than peripheral part of the semiconductor integrated circuit device a plurality of bump electrodes as provided in a longitudinal direction of the semiconductor integrated circuit device, part of the image signal lines being formed on the one substrate is such that a terminal section is connected to each bump electrode of the semiconductor integrated circuit device while letting a region including the terminal section be covered by the semiconductor integrated circuit device.

In addition, according to one preferred form of the invention, the plurality of bump electrodes are formed into a plurality of columns in the longitudinal direction of the semiconductor integrated circuit device.

In addition, according to one preferred form of the invention, more than one bump electrode of a partial column of the plurality of columns is arranged so that a length in the longitudinal direction of the semiconductor integrated circuit device is longer than a length of a bump electrode in the longitudinal direction of the semiconductor integrated circuit device, the bump electrode belonging to a column in a direction in which the wiring layer of the film substrate is extended than the column.

Additionally, the invention is concerned with a liquid crystal display device comprising a liquid crystal display element having a plurality of pixels and a plurality of image signal lines for applying a gradation/tone voltage corresponding to display data to the plurality of pixels and image signal line drive unit for supplying to each image signal line a gradation/tone voltage corresponding to display data, wherein the image line drive unit has a film substrate with a plurality of wiring layers formed thereover and more than one semiconductor integrated circuit device as mounted on the film substrate, the semiconductor integrated circuit device has a plurality of bump electrodes, and portions of the plurality of bump electrodes are electrically connected together by a wiring layer as provided at the film substrate.

Additionally, the invention is concerned with a liquid crystal display device comprising a liquid crystal display element having a plurality of pixels and a plurality of image signal lines for applying a gradation/tone voltage corresponding to display data to the plurality of pixels, and an image signal line drive unit for supplying to each image signal line a gradation/tone voltage corresponding to display data, wherein the image line drive unit has a film substrate with a plurality of wiring layers formed thereover and more than one semiconductor integrated circuit device as mounted on the film substrate, the semiconductor integrated circuit device has a plurality of bump electrodes, portions of the plurality of bump electrodes are electrically connected together by a wiring layer as provided at the film substrate, and an input signal is externally applied to the wiring layer for connection between the bump electrodes.

BRIEF DESCRIPTION OF THE DRAWINGS

FIG. 4 is a diagram for explanation of the polarity of a liquid crystal drive voltage as output from a drain driver to a drain signal line (D) in case a dot inversion method is used as a drive method of the liquid crystal display module;

DESCRIPTION OF THE PREFERRED EMBODIMENTS

Figure 1:
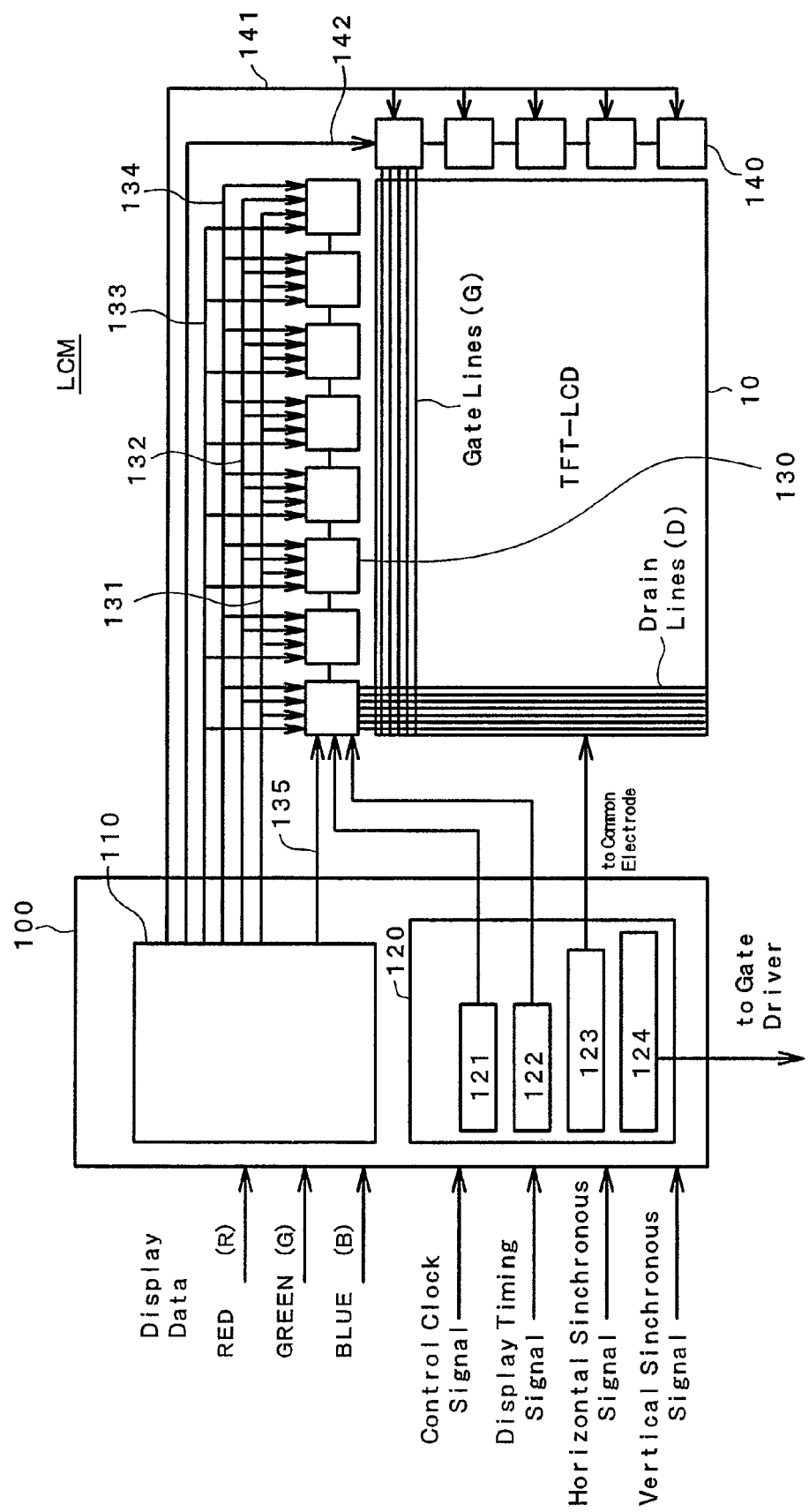
FIG. 1 is a block diagram schematically showing a configuration of a liquid crystal display module of the TFT type to which the invention is applied.

Preferred embodiments of the invention will be explained with reference to the accompanying drawings below.

Note that in all the drawings used to explain the embodiments of the invention, those having same functions will be designated by same reference characters and any repetitive explanation thereof will be eliminated.

(Embodiment 1)
<Basic Arrangement of Display Device to which the Invention is Applied>

FIG. 1 is a block diagram schematically showing an arrangement of a liquid crystal display module of the TFT type to which the invention is applied.

The liquid crystal display module (LCM) shown in FIG. 1 is such that drain drivers 130 are disposed along one side on the long edge side of a liquid crystal display panel (TFT-LCD) 10 whereas gate drivers 140 are laid out along one side on the short edge side of the liquid crystal display panel 10.

The liquid crystal display panel 10 is constituted from 1,600×800×3 picture elements, for example.

Additionally here, a single picture element is to be understood to mean one pixel (Pix) of red (R), green (G) and blue (B).

Control signals being output from a host computer side such as a personal computer, which signals consist essentially of three-color display data (image signal) of red (R), green (G) and blue (B), clock signal, display timing signal and synchronization signals (horizontal sync signal, vertical sync signal) are input via an interface connector to a display control device (TFT controller) 110.

Figure 24:
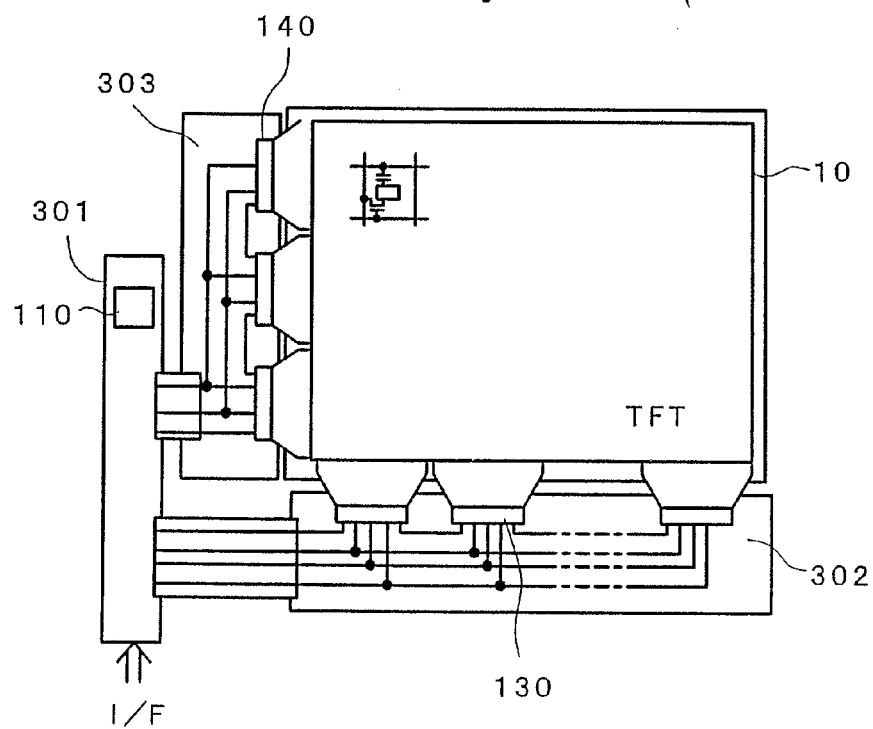
FIG. 24 is a block diagram showing a schematic configuration of one example of a related art TFT liquid crystal display module.
Figure 25:
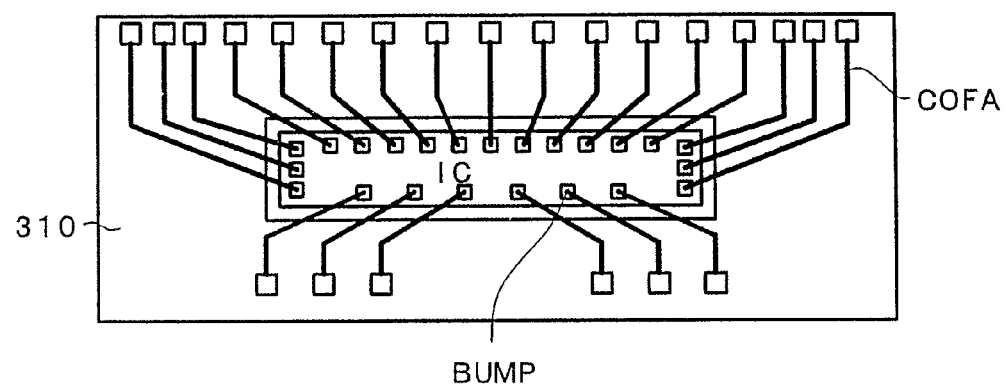
FIG. 25 is a diagram showing a related art film substrate with drain drivers mounted thereon.

In the illustrative embodiment an interface unit 100 is mounted on the above-noted TFT controller substrate 301 shown in FIG. 24, the drain drivers 130 are mounted on the drain driver substrate 302 shown in FIG. 24, and the gate drivers 140 are on the gate driver substrate 303 shown in FIG. 24.

Here, semiconductor chips (ICs) making up the drain drivers 130 and gate drivers 140 are mounted on a film substrate 310 by either so-called tape carrier package techniques or chip-on-film techniques.

Note that the above semiconductor chips (ICs) may alternatively be mounted directly on one transparent substrate of the liquid crystal display panel 10 by chip-on-glass technologies.

<Arrangement of Liquid Crystal Display Panel 10 Shown in FIG. 1>

Figure 2:
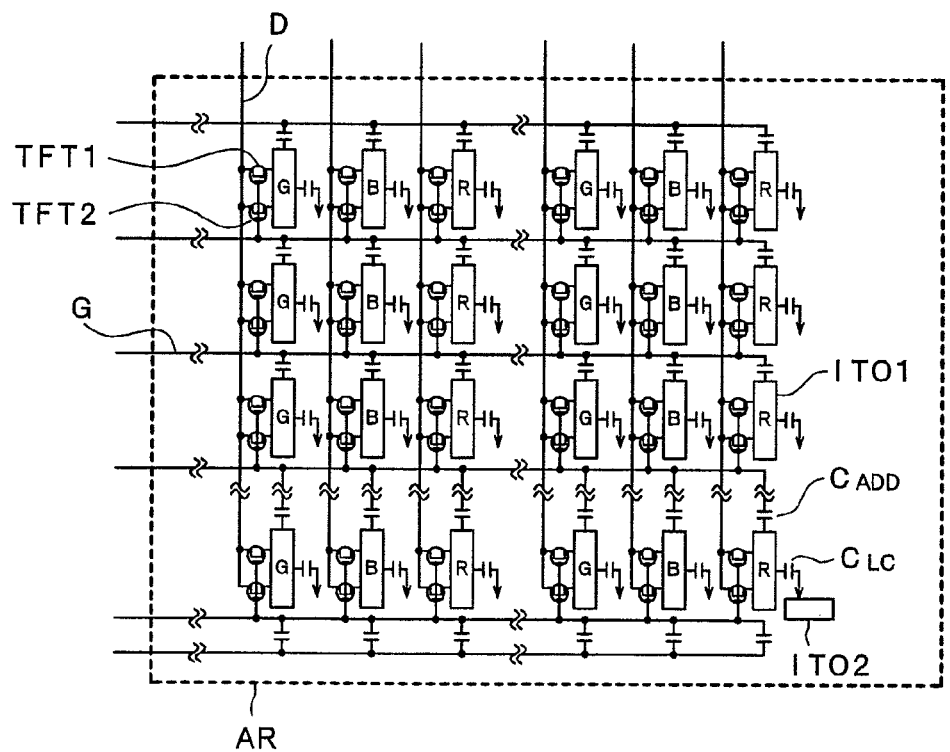
FIG. 2 is a diagram showing an equivalent circuit of one example of the liquid crystal display panel shown in FIG. 1.

FIG. 2 is a diagram showing an equivalent circuit of one example of the liquid crystal display panel 10 shown in FIG. 1.

As shown in this FIG. 2, the liquid crystal display panel 10 has a plurality of picture elements or pixels that are formed into a matrix form.

Each pixel is disposed within a cross-over or "intersection" region defined by two neighboring signal lines (drain signal lines (D) or gate signal lines (G)) and two neighboring signal lines (gate signal lines (G) or drain signal lines (D)).

Each pixel has thin-film transistors (TFT1, TFT2), wherein source electrodes of such thin-film transistors (TFT1, TFT2) are connected to a pixel electrode (ITO1).

Additionally, since a liquid crystal layer is provided between the pixel electrode (ITO1) and a common electrode (ITO2), a liquid crystal capacitor (CLC) is equivalently connected between the pixel electrode (ITO1) and common electrode (ITO2).

Further, an additional capacitor (CADD) is connected between the source electrodes of the thin-film transistors (TFT1, TFT2) and a gate signal line (G) of the previous stage.

Figure 3:
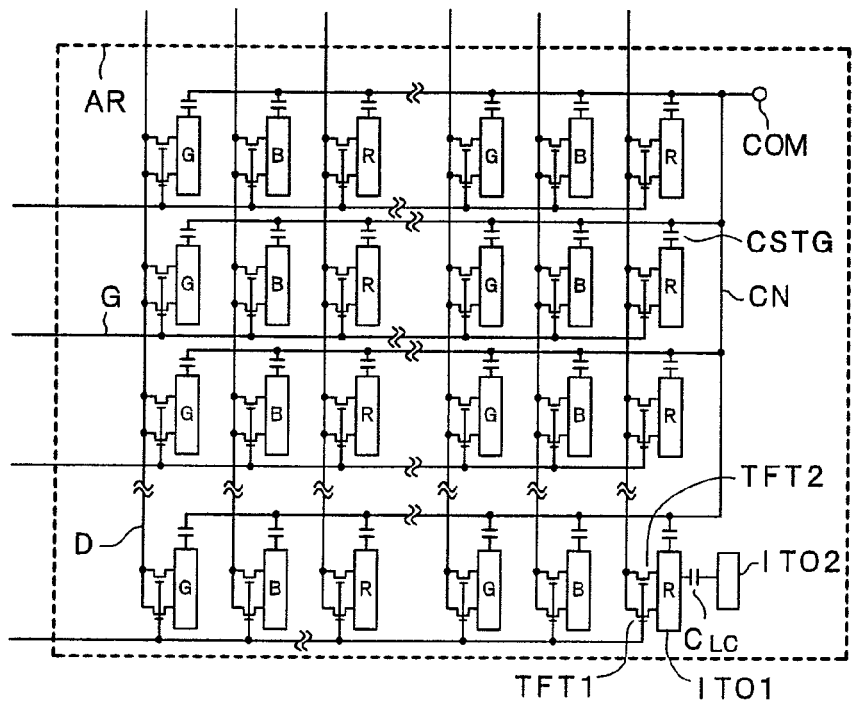
FIG. 3 is a diagram showing an equivalent circuit of another example of the liquid crystal display panel shown in FIG. 1.

FIG. 3 is a diagram showing an equivalent circuit of another example of the liquid crystal display panel 10 shown in FIG. 1.

While in the example shown in FIG. 2 the additional capacitor (CADD) is formed between the pre-stage gate signal line (G) and the source electrode, the equivalent circuit of the example shown in FIG. 3 is different therefrom in that the storage capacitor (CSTG) is formed between a common signal line (CN) and source electrode.

Although the invention is applicable to the both, the former scheme is such that a pre-stage gate signal line (G) pulse jumps into the pixel electrode (ITO1) through the additional capacitor (CADD) whereas the latter scheme is such that such jump-in will no longer take place enabling achievement of more excellent displaying.

Note that FIGS. 2 and 3 show equivalent circuits of liquid crystal display panels of the type employing longitudinal electric field schemes. In FIGS. 2-3, "AR" is a display region.

Additionally, although FIGS. 2-3 are circuit diagrams, illustration is made in a way corresponding to actually implementable geometric layouts.

In the liquid crystal display panels 10 shown in FIGS. 2-3, drain electrodes of thin-film transistors (TFT1, TFT2) of each of the pixels that are disposed in a column direction are connected to drain signal lines (D) respectively, wherein each drain signal line (D) is connected to a drain driver 130 which applies a gradation/tone voltage to liquid crystal of each pixel in the column direction.

In addition, gate electrodes of thin-film transistors (TFT1, TFT2) in each of the pixels that are disposed in a row direction are connected to gate signal lines (G) respectively, wherein each gate signal line (G) is connected to a gate driver 140 which supplies within one horizontal scanning time period a scan drive voltage (positive bias voltage or negative bias voltage) to the gate electrodes of the thin-film transistors (TFT1, TFT2) of each pixel in the row direction.

<Arrangement and Operation Summary of Interface Unit 100 Shown in FIG. 1>

The interface unit 100 shown in FIG. 1 is made up from a display control device 110 and a power supply circuit 120.

The display control device 110 is formed of a single semiconductor integrated circuit (LSI), which is operable to control and drive the drain drivers 130 and gate drivers 140 on the basis of display data (R•G•B) and respective display control signals including but not limited to a clock signal, display timing signal, horizontal sync signal and vertical sync signal as transmitted from a computer main body side.

Upon inputting of the display timing signal, the display control device 110 judges it as a display startup position and then outputs a start pulse (display data accept start signal) to a first drain driver 130 via a signal line 135 and further outputs the received display data of simple one column to drain drivers 130 through a display data bus line 133.

In such an event the display control device 110 outputs via a signal line 131 a display data latch-use clock (CL2) (simply referred to as "clock (CL2)" hereinafter) which is a display control signal for latching display data at a data latch circuit of each drain driver 130.

It should be noted that even in this embodiment also, the control signals and display data or the like from the display control device 110 are input to each drain driver 130 via the TFT controller substrate 301 and drain driver substrate 302 in the above-stated way shown in FIG. 24.

Display data from the computer main body side is of 6 bits for example and will be transferred on a per-unit time basis with single pixel being as a unit, that is, with respective data bits of red (R), green (G) and blue (B) being combined together into one set.

In addition a latching operation of the data latch circuit at the first drain driver 130 will be controlled in response to the start pulse as input to the first drain driver 130.

Upon termination of the latch operation of the data latch circuit at this first drain driver 130, the start pulse is input from the first drain driver 130 to a second drain driver 130 for control of a latch operation of a data latch circuit at the second drain driver 130.

Thereafter, a similar operation will be repeated for controlling the latch operation of a data latch circuit at each drain driver 130, thereby preventing incorrect display data from being written into the data latch circuit.

Upon termination of inputting of the display timing signal or alternatively when a predefined length of time is elapsed from a time point at which the display timing signal was inputted, the display control device 110 regards it as termination of display data of one horizontal portion and then outputs to each drain driver 130 via a signal line 132 an output timing control clock (CL1) (simply referred to as clock (CL1) hereinafter) which is a display control signal for outputting the display data being stored or accumulated at the data latch circuit at each drain driver 130 to more than one drain signal line (D) of the liquid crystal display panel 10.

Additionally when the first display timing signal is input after input of a vertical sync signal, the display control device 110 judges it as a first display line and then outputs a frame start instruction signal to the gate driver(s) 140 via a signal line 142.

Further, the display control device 110 outputs based on a horizontal sync signal a clock (CL3) that is a shift clock of one horizontal scan time period to the gate driver(s) 140 via a signal line 141 for sequential application of a positive bias voltage to each gate signal line (G) of the liquid crystal display panel 10 once at a time whenever one horizontal scan period has elapsed.

Thus, a plurality of thin-film transistors (TFT1, TFT2) connected to each gate signal line (G) of the liquid crystal display panel 10 are rendered conductive within the one horizontal scan time period.

With the above operation, an image will be displayed on the liquid crystal display panel 10.

<Arrangement of Power Supply Circuit 120 Shown in FIG. 1>

The power supply circuit 120 shown in FIG. 1 is configured from a positive voltage generation circuit 121, a negative voltage generator circuit 122, a common electrode (opposite or "counter" electrode) voltage generator circuit 123, and a gate electrode voltage generator circuit 124.

The positive voltage generator circuit 121 and negative voltage generator circuit 122 are each formed of a serial resistance voltage divider circuit, wherein the positive voltage generator circuit 121 is designed to output a five-value gradation/tone reference voltage of the positive polarity (V"0 to V"4) whereas the negative voltage generator circuit 122 outputs a five-value gradation/tone reference voltage of the negative polarity (V"5 to V"9).

These five-value gradation/tone reference voltage of the positive polarity (V"0 to V"4) and five-value gradation/tone reference voltage of the negative polarity (v"5 to V"9) are supplied to each drain driver 130.

In addition, a polarity inversion signal (AC-modified signal M) from the display control device 110 is also supplied to each drain driver 130 via a signal line 134.

The common electrode voltage generator circuit 123 generates a drive voltage to be applied to a common electrode (ITO2) whereas the gate electrode voltage generator circuit 124 generates drive voltages (positive bias voltage and negative bias voltage) being applied to the gate electrodes of thin-film transistors (TFT1, TFT2).

<AC-Modified Drive Method of Liquid Crystal Display Module Shown in FIG. 1>

Generally the liquid crystal layer is such that if the same voltage (DC voltage) is being applied a long time then the liquid crystal layer's inclination or tilt is fixed resulting in occurrence of after-image phenomena, which in turn causes a decrease in lifetime of the liquid crystal layer.

To avoid this, the liquid crystal display module is designed so that any voltage being applied to the liquid crystal layer is converted to an AC-like voltage—say, AC-modified—once at a time whenever a predefined length of time has elapsed; more specifically, let a voltage being applied to a pixel electrode potentially change toward the positive voltage side/negative voltage side in units of predetermined time periods with the voltage as applied to a common electrode being as a standard or "reference."

Known drive methodology for applying such AC-modified voltage to this liquid crystal layer includes two methods: a common symmetry method, and common inversion method.

The common inversion method is the method that alternately inverts the voltage being applied to the common electrode and the voltage applied to pixel electrode to have positive and negative polarities.

In contrast, the common symmetry method is the method that makes the voltage being applied to the common electrode constant in potential while alternately inverting the voltage as applied to the pixel electrode into positive and negative polarities with the voltage applied to the common electrode being as a reference.

Although the common symmetry method has a disadvantage that the amplitude of a voltage being applied to pixel electrode (ITO1) becomes two times greater than that in the common inversion method resulting in presence of an incapability to make use of any low breakdown-voltage drivers unless "special" liquid crystals low in threshold voltage is newly developed, it is possible to use either dot inversion methods or N-line inversion methods excellent both in lower power consumption and in higher display quality.

One typical dot inversion method will next be explained below.

FIG. 4 is a diagram used to explain the polarity of a liquid crystal drive voltage (i.e. gradation/tone voltage being applied to pixel electrode (ITO1)) that is output from a drain driver 130 onto its associative drain signal line (D) in case the dot inversion method is used as a liquid crystal display module driving method.

As shown in FIG. 4, in the case where the dot inversion method is used as the liquid crystal display module drive method, at an odd-numbered line of an odd-numbered frame for example, a liquid crystal drive voltage (indicated by "●" in FIG. 4) that is of the negative polarity relative to a liquid crystal drive voltage (VCOM) to be applied to the common electrode (ITO2) is applied from a drain driver 130 to an odd-numbered drain signal line (D) whereas a liquid crystal drive voltage (indicated by "○" in FIG. 4) that is positive in polarity relative to the liquid crystal drive voltage (VCOM) being applied to the common electrode (ITO2) is applied to an even-numbered drain signal line (D).

Further, at an even-numbered line of the odd-numbered frame, a liquid crystal drive voltage of the positive polarity is applied from drain driver 130 to odd-numbered drain signal line (D) while letting a liquid crystal drive voltage of the negative polarity be applied to even-numbered drain signal line (D). In addition, the polarity per each line is inverted in units of frames. More specifically, as shown in FIG. 4, at an odd-numbered line of even-numbered frame, a positive liquid crystal drive voltage is applied from drain driver 130 to odd-numbered drain signal line (D) whereas a negative liquid crystal drive voltage is applied to even-numbered drain signal line (D).

Further, at even-numbered line of even-numbered frame, a negative liquid crystal drive voltage is applied from drain driver 130 to odd-numbered drain signal line (D) whereas a positive liquid crystal drive voltage is applied to even-numbered drain signal line (D).

The use of this dot inversion method permits voltages being applied to neighboring drain signal lines (D) to have reversed polarities, which in turn makes it possible for currents flowing into common electrodes (ITO2) and/or thin-film transistor (TFT1, TFT2) gate electrodes to cancel out each other between neighboring ones, resulting in a decrease in resultant power consumption.

Another advantage lies in an ability to render the common electrode (ITO2)'s voltage level stable to thereby greatly suppress or minimize display quality reducibilities because of the fact that the common electrode (ITO2)-flowing current becomes less thereby preventing voltage dropdown from becoming greater.

<Arrangement of Drain Driver 130 Shown in FIG. 1>

Figure 5:
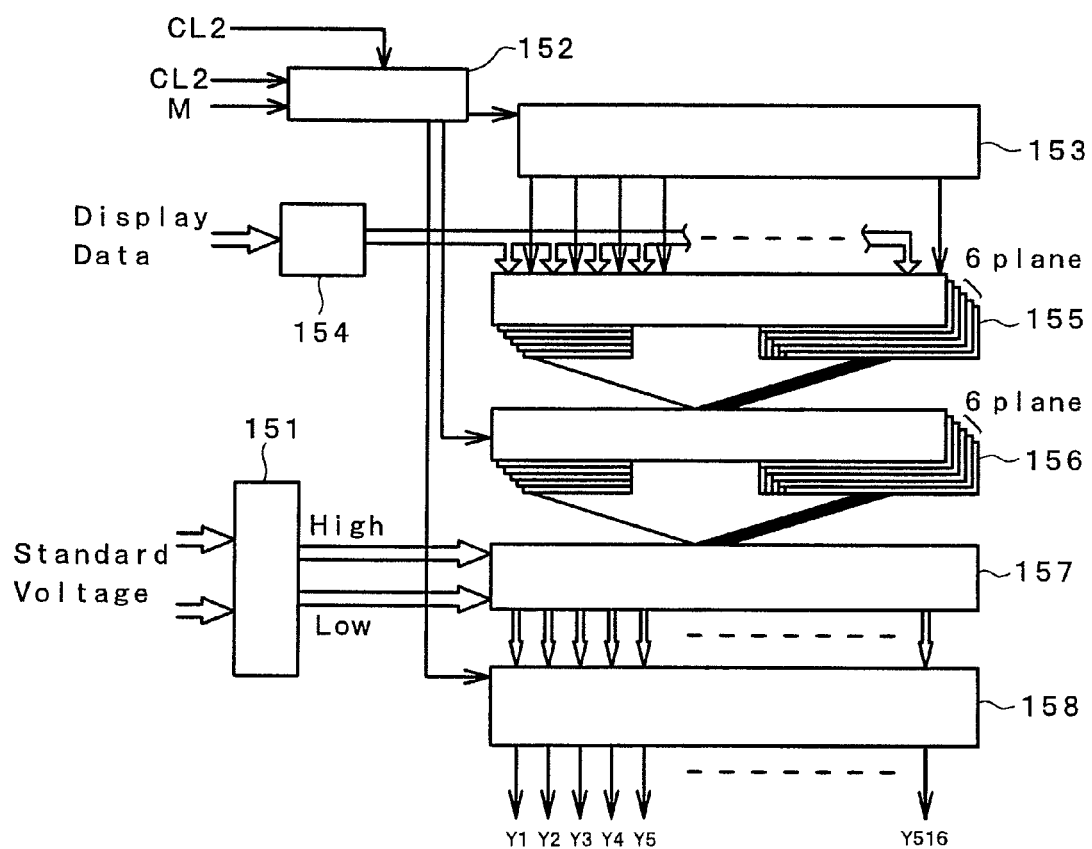
FIG. 5 is a block diagram schematically showing a configuration of one example of the drain driver shown in FIG. 1.

FIG. 5 is a block diagram schematically showing a configuration of one example of the drain driver 130 shown in FIG. 1.

Note that the drain driver 130 is formed of a single semiconductor integrated circuit (LSI).

In FIG. 5 a gradation/tone voltage generator circuit 151 generates a positive gradation/tone voltage with 64 gradation levels or "gray scales" based on the positive-polarity five-value gradation/tone reference voltage (V"0 to V"4) as input from the positive voltage generator circuit 121 and also a negative gradation/tone voltage with 64 gray scales based on the negative five-value gradation/tone reference voltage (V"5 to V"9) being input from the negative voltage generator circuit 122, and then outputs the respective 64-gray-scale gradation/tone voltages of the positive and negative polarities to a decoder circuit 157 through a voltage bus line(s).

Additionally a shift register circuit 153 generates a data accept signal based on a shift clock synchronized with a clock (CL2) being output from a clock control circuit 152 and then outputs it to a latch circuit (1) 155.

Display data to be input from the display control device 110 is temporarily latched at an input latch circuit 154.

This input latch circuit 154 latches the display data based on a clock from a clock control circuit 152.

The latch circuit (1) 155 is operable based on the data accept signal as output from shift register circuit 153 to latch an output line-equivalent number of 6-bit display data per each color being output from the input latch circuit 154 in a way synchronous with the clock (CL2) as input from display control device 110.

A latch circuit (2) 156 latches the display data within the latch circuit (1) 155 in accordance with a clock (CL1) being input from the display control device 110.

The display data as taken into or "imported" to this latch circuit (2) 156 will then be input to the decoder circuit 157 via internal level-shift circuitry.

The decoder circuit 157 selects from either the positive 64-gray-scale gradation/tone voltage or negative 64-gray-scale gradation/tone voltage a single gradation/tone voltage corresponding to the display data (voltage indicative of the one selected from among 64 gradation levels) and then outputs it to a buffer circuit 158.

The buffer circuit 158 amplifies (current-amplifies) the input gradation/tone voltage for output to each drain signal line (D).

Figure 6:
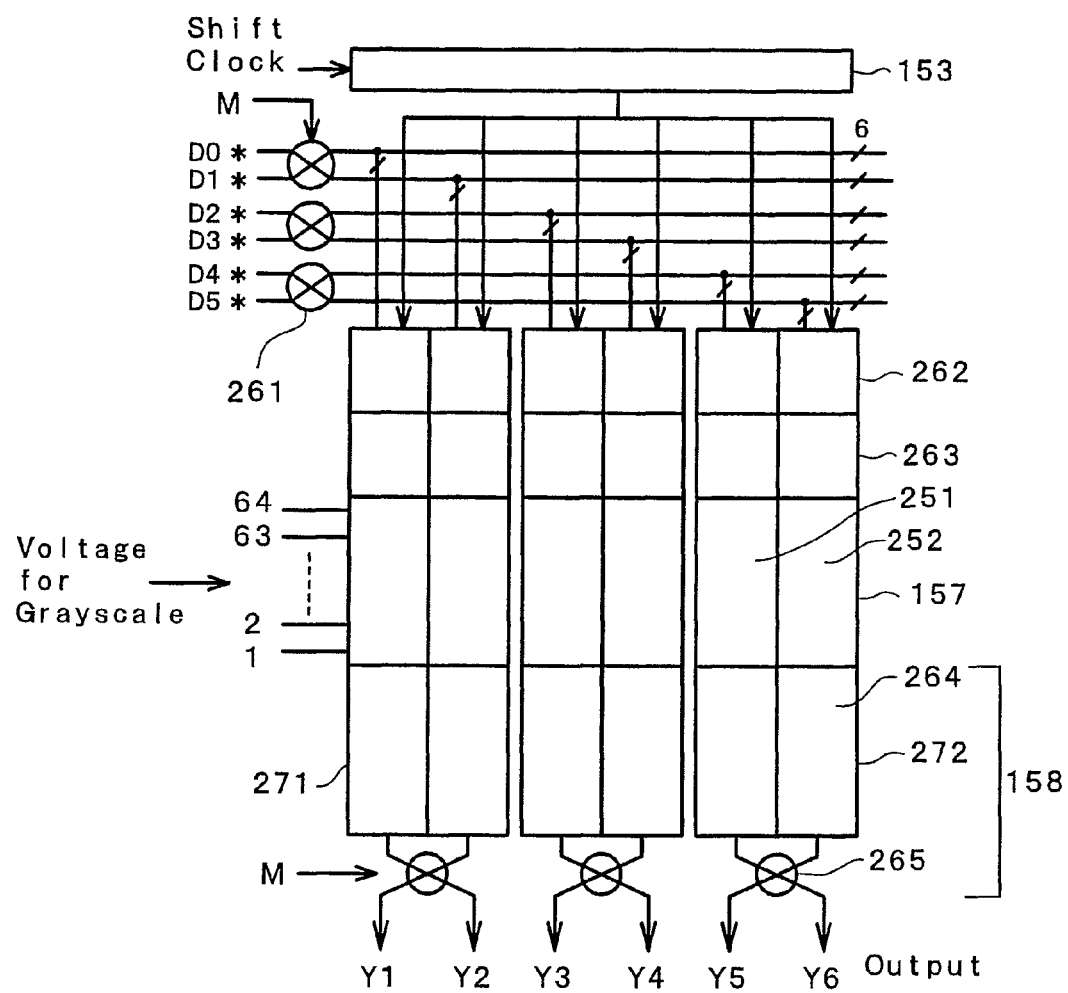
FIG. 6 is a block diagram used to explain more practically a configuration of one example of the drain driver shown in FIG. 5.

FIG. 6 is a block diagram that is used to more practically explain a configuration of one example of the drain driver 130 shown in FIG. 5.

In FIG. 6, reference numeral "153" designates the shift register circuit shown in FIG. 5, and 157 denotes the decoder circuit shown in FIG. 5, wherein a data latch unit 262 represents latching of the latch circuit (1) 155 and latch circuit (2) 156 shown in FIG. 5 whereas a level shift circuit 263 indicates a level-shift circuit within the latch circuit (2) shown in FIG. 5.

Further, an amplifier circuit 264 and an output selector circuit 265 for changing over or switching an output of the amplifier circuit 264 constitute the buffer circuit 157 shown in FIG. 5.

Here, a display data selector circuit 261 and the output selector circuit 265 are controlled based on a polarity inversion signal (M).

In addition, Y1, Y2, Y3, Y4, Y5 and Y6 designate first, second, third, fourth, fifth and sixth drain signal lines (D), respectively.

In the drain driver 130 shown in FIG. 6, the display data selector circuit 261 is operable to switch a data accept signal as input by the display data selector circuit 261 to the data latch unit 262 (in more detail, latch circuit (1) 155 shown in FIG. 5) and then input continuous display data to the neighboring data latch units 262.

The decoder circuit 157 is formed of a high-voltage decoder circuit 251 which selects from among positive-polarity gradation/tone voltages of 64 gray scale levels being supplied from the gradation/tone voltage generator circuit 151 a gradation/tone voltage of the positive polarity that corresponds to display data to be output from each data latch circuit 262 (in greater detail, latch circuit (2) 156 shown in FIG. 5), and a low-voltage decoder circuit 252 which selects from among negative gradation/tone voltages of 64 gray scales being supplied from the gradation/tone voltage generator circuit 151 a gradation/tone voltage of the negative polarity that corresponds to display data to be output from each data latch circuit 262.

The high-voltage decoder circuit 251 and low-voltage decoder circuit 252 are provided in units of neighboring data latch units 262.

The amplifier circuit 264 is formed of a high-voltage amplifier circuit 271 and low-voltage amplifier circuit 272.

A positive gradation/tone voltage as generated at the high-voltage decoder circuit 251 is input to the high-voltage amplifier circuit 271, which then outputs a positive gradation/tone voltage.

A negative gradation/tone voltage as generated at the low-voltage decoder circuit 252 is input to the low-voltage amplifier circuit 272, which then outputs a negative gradation/tone voltage.

With the dot inversion method, gradation/tone voltages of continuous display data will become reversed in polarity to each other while a serial array layout or "queue" of amplifier circuits 264 becomes the high-voltage amplifier circuit 271→low-voltage amplifier circuit 272→high-voltage amplifier circuit 271→low-voltage amplifier circuit 272; thus, it becomes possible to output either positive or negative gradation/tone voltage to each drain signal line (D) by causing the display data selector circuit 261 to switch display data being input to the data latch unit 262 and then input continuous display data to alternately neighboring data latch units 262 while in a way synchronized therewith letting the output selector circuit 265 switch an output voltage as output from either the high-voltage amplifier circuit 271 or low-voltage amplifier circuit 272 and then output it to more than one drain signal line (D) from which the gradation/tone voltage of continuous display data will be output—for example, a first drain signal line (Y1) and second drain signal line (Y2).

Figure 7:
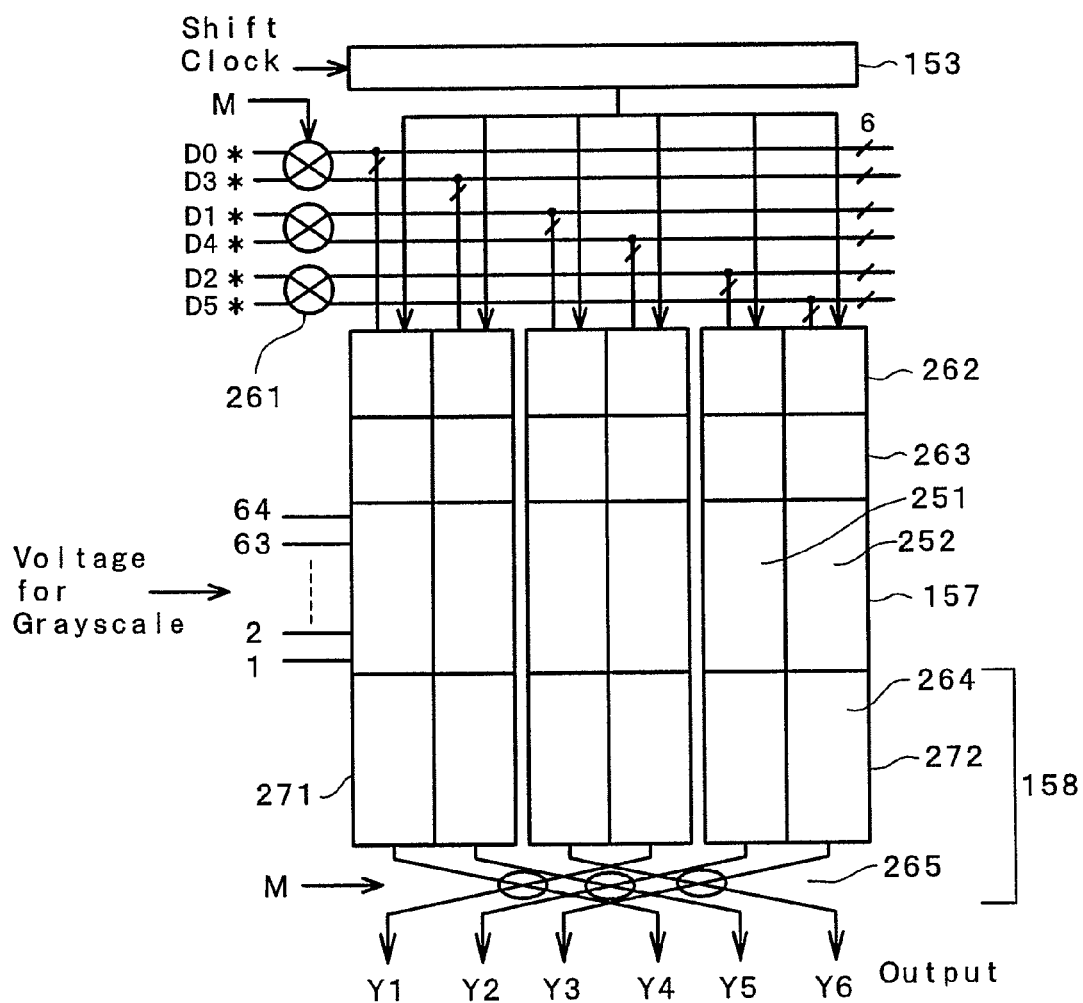
FIG. 7 is a block diagram used to explain more practically a configuration of another example of the drain driver shown in FIG. 5.

FIG. 7 is a block diagram used to more practically explain the configuration of another example of the drain driver 130 shown in FIG. 5.

This example shown in FIG. 7 is the one which is arranged to utilize the fact that gradation/tone voltages of neighboring display data of respective colors become reversed in polarity to each other for causing the display data selector circuit 261 to switch display data being input to the data latch unit 262 and then input continuous display data of respective colors to neighboring data latch units 262 while in a way synchronized therewith letting the output selector circuit 265 switch an output voltage as output from either the high-voltage amplifier circuit 271 or low-voltage amplifier circuit 272 and then output it to certain drain signal lines (D) from which the gradation/tone voltages of continuous display data of respective colors will be output—e.g. the first drain signal line (Y1) and fourth drain signal line (Y4).

With the examples shown in FIGS. 6 and 7, these are aimed at reduction in chip size of semiconductor chips (ICs) by reducing the requisite number of low-voltage circuits and high-voltage circuits only to that corresponding to ½ of the terminal number, rather than setting it at the total number of output terminals involved.

Figure 8:
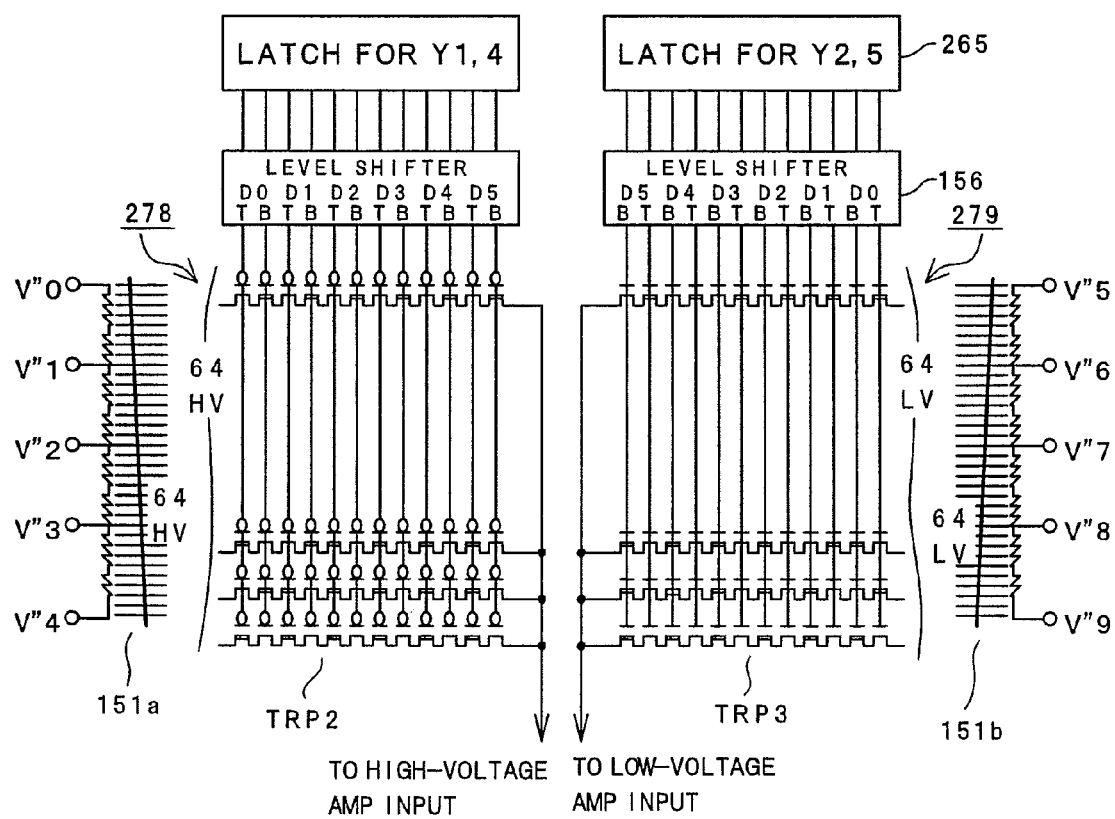
FIG. 8 is a circuit diagram showing a schematic configuration of one example of a high-voltage decoder circuit and low-voltage decoder circuit shown in FIGS. 6 and 7.

FIG. 8 is a circuit diagram showing a schematic configuration of one example of the high-voltage decoder circuit 251 and low-voltage decoder circuit 252 shown in FIGS. 6 and 7.

With the example shown in FIG. 8, the high-voltage decoder circuit 251 or the low-voltage decoder circuit 252 shown in FIG. 6 is constituted from a transistor array or "train" (TRP2, TRP3) with a serial connection of enhancement MOS transistors and depression MOS transistors.

Figure 9:
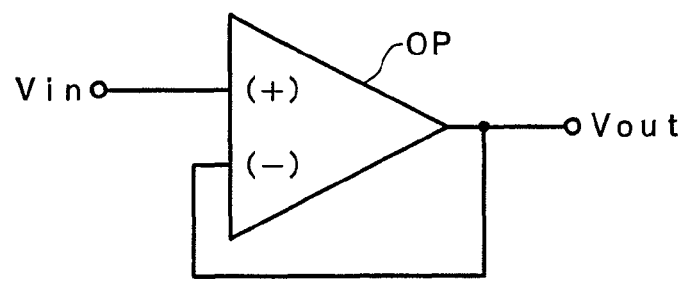
FIG. 9 is a circuit diagram showing a schematic arrangement of one example of the high-voltage amplifier circuit and low-voltage amplifier circuit shown in FIGS. 6 and 7.

The high-voltage amplifier circuit 271 and low-voltage amplifier circuit 272 shown in FIGS. 6-7 are each formed of a voltage follower circuit, wherein the inverting input terminal (BUMP) (−) and output terminal (BUMP) of an operational amplifier or "ope-amp" (OP) are directly connected together with its non-inverting input terminal (BUMP) (+) being used as an input terminal (BUMP) as shown in FIG. 9 by way of example.

Figure 10:
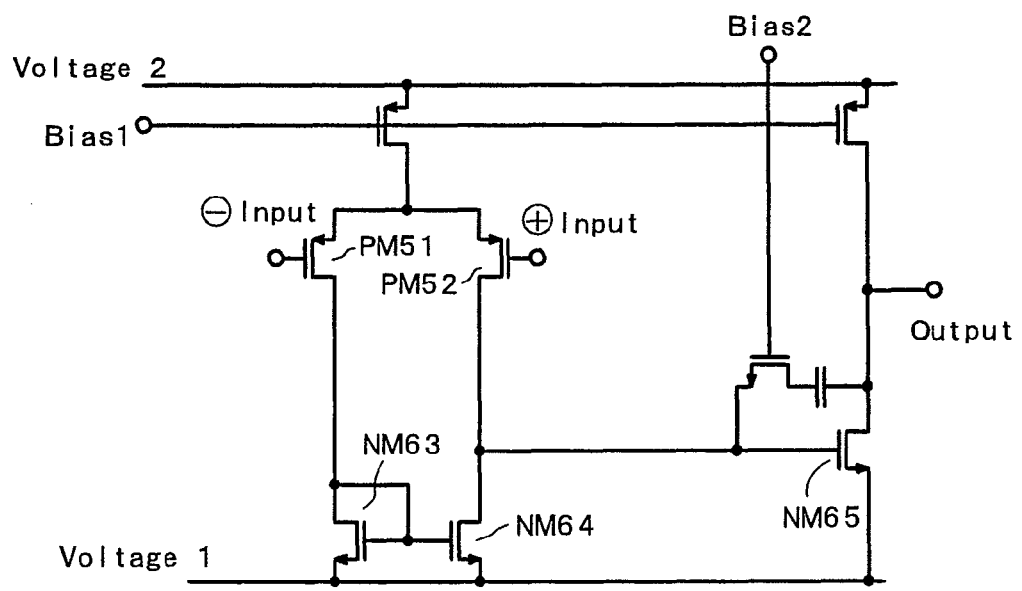
FIG. 10 is a circuit diagram showing a differential amplifier circuit for use in an operational amplifier of the low-voltage amplifier circuit shown in FIG. 9.
Figure 11:
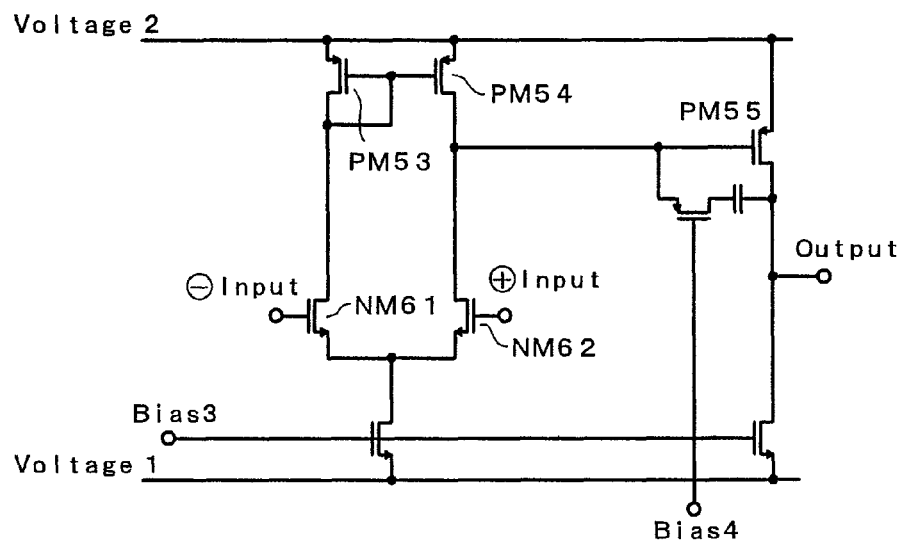
FIG. 11 is a circuit diagram showing a differential amplifier circuit for use in an operational amplifier of the high-voltage amplifier circuit shown in FIG. 9.

Here, the ope-amp (OP) for use in the low-voltage amplifier circuit 272 is formed for example of a differential amplifier circuit such as shown in FIG. 10; further, the ope-amp (OP) used for the high-voltage amplifier circuit 271 is formed for example of a differential amplifier circuit shown in FIG. 11.

Figure 12:
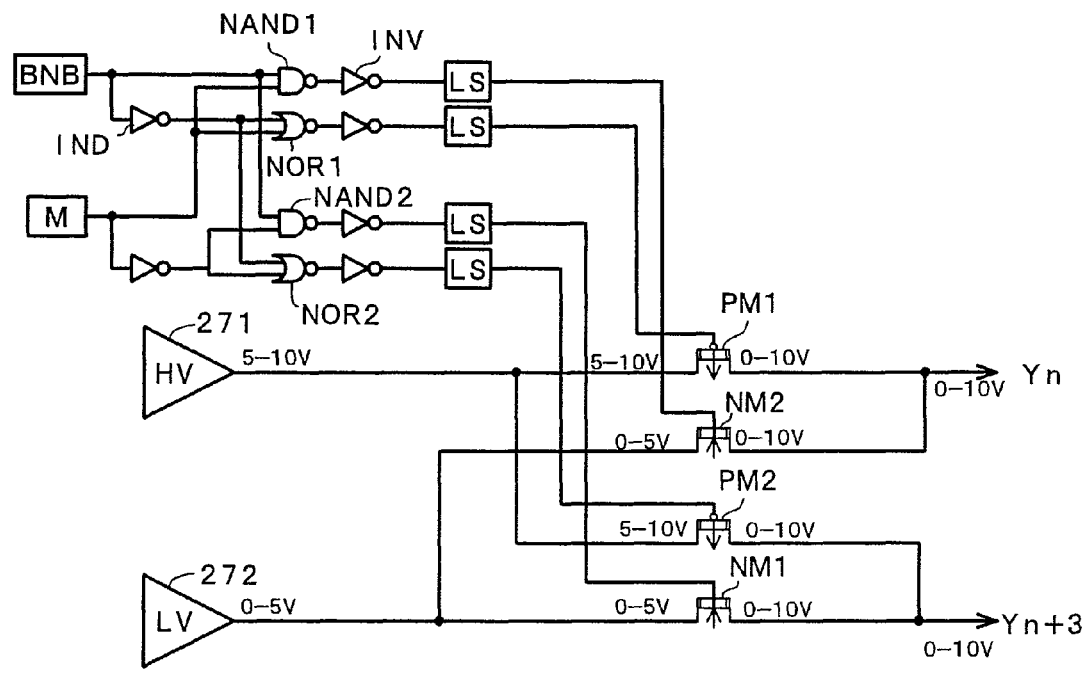
FIG. 12 is a circuit diagram showing a circuit configuration of a selector circuit as one example of an output selection circuit shown in FIG. 7.

FIG. 12 is a circuit diagram showing a circuit configuration of one selector circuit of one example of the output selector circuit 265 shown in FIG. 7.

As shown in FIG. 12, one selector circuit of the output selector circuits 265 shown in FIG. 7 has a PMOS transistor (PM1) that is connected between the high-voltage amplifier circuit 271 and n-th drain signal (Yn), a PMOS transistor (PM2) being connected between the high-voltage amplifier circuit 271 and (n+3)th drain signal (Yn+3), an NMOS transistor (NM1) connected between the low-voltage amplifier circuit 272 and (n+3)th drain signal (Yn+3), and an NMOS transistor (NM2) coupled between the low-voltage amplifier circuit 272 and n-th drain signal (Yn).

The PMOS transistor (PM1) has its gate electrode to which an output of a NOR circuit (NOR1) that has been inverted by an inverter (INV) is input after having been level-shifted by a level shift circuit (LS) whereas the PMOS transistor (PM2) has its gate electrode to which an output of a NOR circuit (NOR2) that has been inverted by an inverter (INV) is input after having been level-shifted by a level shift circuit (LS).

Similarly an output of a NAND circuit (NAND2) which has been inverted by an inverter (INV) is input to the gate electrode of the NMOS transistor (NM1) after having level-shifted by level shift circuit (LS) whereas an output of a NAND circuit (NAND1) that has been inverted by inverter (INV) is input to the gate electrode of the NMOS transistor (NM2) after having level-shifted by level shift circuit (LS).

Here, a polarity inversion signal (M) is input to the NAND circuit (NAND1) and NOR circuit (NOR1) while a polarity inversion signal (M) which has been inverted by inverter (INV) is input to the NAND circuit (NAND2) and NOR circuit (NOR2).

In addition an output enable signal (ENB) is input to the NAND circuits (NAND1, NAND2) whereas an output enable signal (ENB) that has been inverted by inverter (INV) is input to the NOR circuits (NOR1, NOR2).

A truth value table of the NAND circuits (NAND1, NAND2) and NOR circuits (NOR1, NOR2) is shown in Table 1 along with ON/OFF states of respective MOS transistors (PM1, PM2, NM1, NM2) at that time.

TABLE 1

| ENB | M | NOR1 | PM1 | NAND2 | NM1 | NAND1 | PM2 | NOR2 | NM2 |
|---|---|---|---|---|---|---|---|---|---|
| L | * | L | OFF | H | OFF | H | OFF | L | OFF |
| H | H | L | OFF | H | OFF | L | ON | H | ON |
|   | L | H | ON | L | ON | H | OFF | L | OFF |

Symbol "*" represents irrelevancy to AC-modified signal (M).

As apparent from Table 1, when the output enable signal (ENB) is at "Low" level (referred to hereinafter as "L" level) the NAND circuits (NAND1, NAND2) are set at "High" level (H level) whereas the NOR circuits (NOR1, NOR2) are at L level causing respective MOS transistors (PM1, PM2, NM1, NM2) to be in the OFF state.

Upon switching of a scan line, both the high-voltage amplifier circuit 271 and low-voltage amplifier circuit 272 are in unstable states.

This output enable signal (ENB) is provided in order to prevent an output of each amplifier circuit (271, 272) from being output onto each drain signal line (D) within scan line switching or changeover periods.

It should be noted that although with this embodiment the inverted signal of a clock (CL1) is used as this output enable signal (ENB), it will also be possible to internally generate it through a process of counting the clock (CL2) or other similar suitable processes.

Also note that as apparent from Table 1 also, when the output enable signal (ENB) is at H level, each NAND circuit (NAND1, NAND2) is at either H level or L level in accordance with the polarity inversion signal (M)'s H level or L level while allowing each NOR circuit (NOR1, NOR2) to be at H level or L level.

Whereby, the PMOS transistor (PM1) and NMOS transistor (NM1) turn on or off and the PMOS transistor (PM2) and NMOS transistor (NM2) turn on or off causing an output of the high-voltage amplifier circuit 271 to be output to the drain signal line (Yn+3) with an output of the low-voltage amplifier circuit 272 being output to drain signal line (Yn), or alternatively causing the output of high-voltage amplifier circuit 271 to be output to the drain signal line (Yn) with the output of low-voltage amplifier circuit 272 being output to drain signal line (Yn+3).

<Characteristic Arrangement of Liquid Crystal Display Module of this Embodiment>

Figure 13:
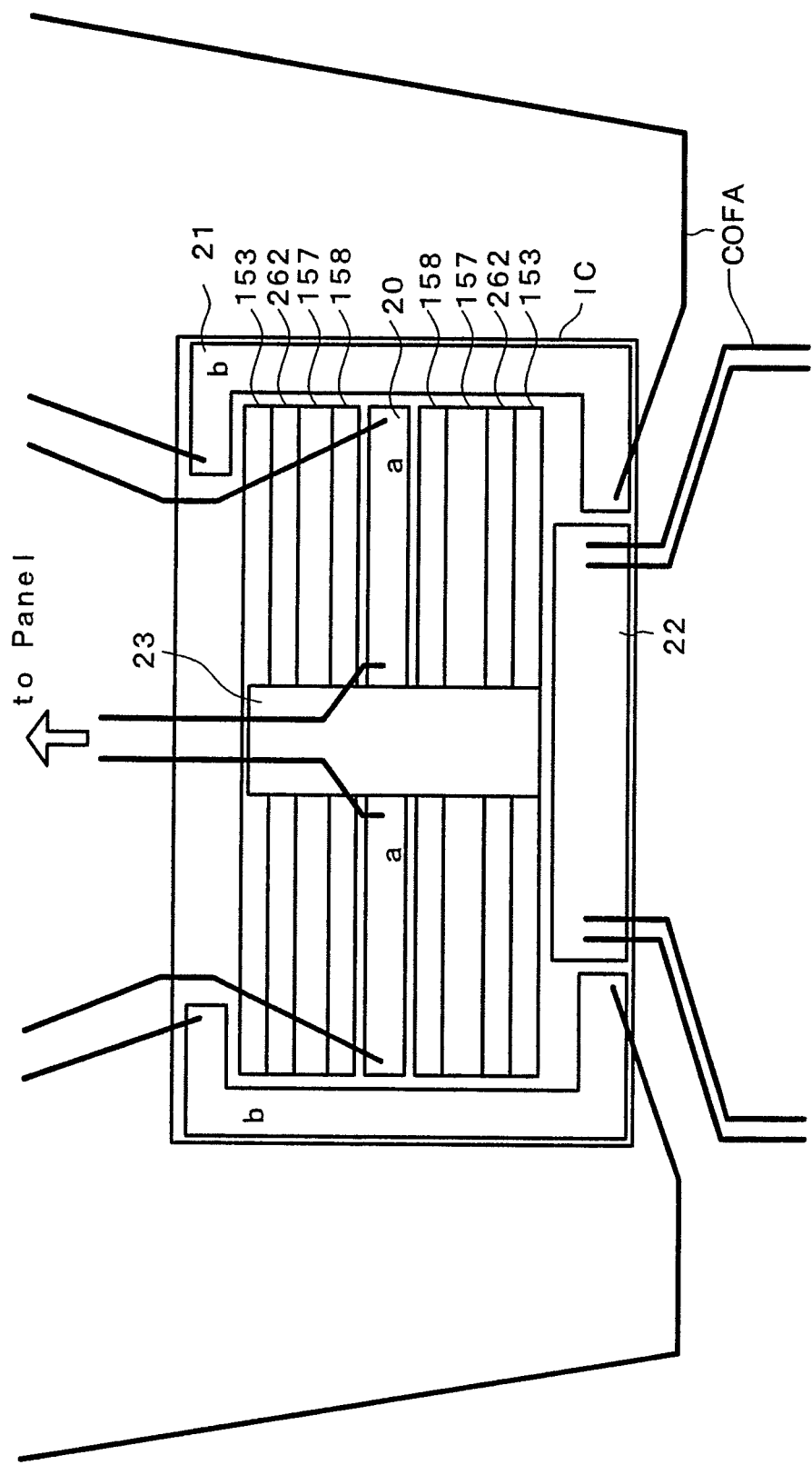
FIG. 13 is a diagram showing a layout of internal circuitry of a semiconductor chip (IC) making up the drain driver of Embodiment 1 of the invention.

FIG. 13 is a diagram showing a layout of internal circuitry of a semiconductor chip (IC) making up the drain driver 130 of this embodiment.

As shown in FIG. 13, this embodiment is characterized in that a specified number of output circuit blocks each of which consists essentially of the shift register circuit 153, data latch unit 262, decoder circuit 157 and buffer circuit 158 are stacked over each other into two stages in the short side direction of semiconductor chip (IC), the number corresponding to an output terminal number.

And, as shown in FIG. 13, an output terminal (bump electrode) region (a) 20 is provided at a central portion in the short side direction of semiconductor chip (IC) while letting the output circuit blocks that are so disposed as to be stacked over each other into the two stages be provided in an order of sequence, from this output terminal region (a) 20, of the buffer circuit 158, decoder circuit 157, data latch unit 262 and shift register circuit 153.

Additionally an input circuit/lead wiring region 23 is provided at a central portion along the longitudinal direction of the semiconductor chip (IC) for supplying display data and a clock(s) to the output circuit blocks that are disposed so that they are stacked into two stages.

In this way, with the illustrative embodiment, disposing those output terminal portions of the same shape in an adjacent region (output terminal region (a)) makes it possible to delete any dead spaces, which in turn enables reduction or shrinkage of the area of such output terminal section. Additionally reference numeral "22" denotes an input terminal region.

With this embodiment, in view of the fact that the output circuit blocks are disposed so that these are stacked over each other into two stages, the shift register circuit 153 is disposed on a per-stage basis.

Due to this, the drain driver 130 of this embodiment is such that a shift register circuit formation region increases when compared to the drain drivers 130 shown in FIGS. 6-7.

However, in light of the fact that the shift register circuit 153 is low-voltage circuitry manufacturable by low breakdown voltage processes and is small in circuit scale, even if it becomes two times greater, the resultant increase in area stays negligible.

In this way, with this embodiment, since the gradation/tone voltage output circuit section which occupies large part of the semiconductor chip (IC) making up the drain driver 130 is specifically arranged to be subdivided into two parts, it is possible to make the semiconductor chip (IC)'s length in the longitudinal direction thereof almost half (½) in comparison with an arrangement for letting such circuits be linearly disposed in the chip's longitudinal direction.

Figure 26:
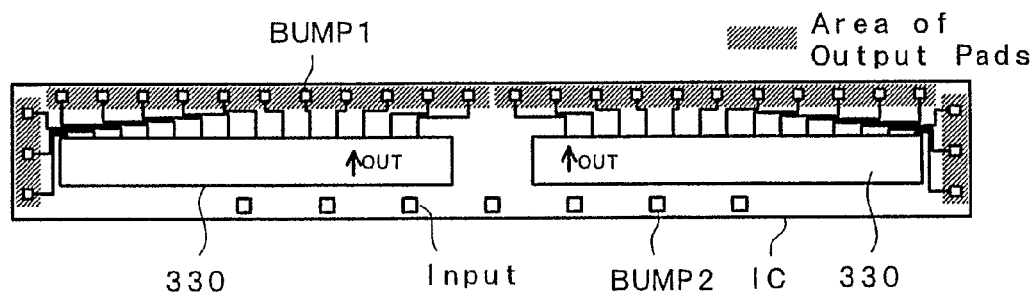
FIG. 26 is a diagram showing a configuration of the terminal section of a related art drain driver.

Note here that in this embodiment, the length of the semiconductor chip (IC) in its short side direction becomes virtually two times greater when compared to an arrangement that the gradation/tone voltage output circuits shown in FIG. 26 are linearly disposed in the chip's longitudinal direction.

To be brief, with this embodiment, an outer shape of the semiconductor chip (IC) constituting the drain driver 130 becomes much like a square rather than an elongated plate shape.

Accordingly, with this embodiment, it is possible to increase the number of chips obtainable from a single wafer as compared to traditional elongate plate-shaped ones while at the same time making it possible to employ low-price apparatus when forming semiconductor chips (ICs) on a single semiconductor wafer by the so-called step-and-repeat exposure techniques; thus, it is possible to reduce production costs of such semiconductor chips (ICs).

It must be noted that in this embodiment, geometrical positioning or layout of output terminals (BUMP1) is determinable by the size of semiconductor chip (IC) and the output terminal number plus distance between output terminals; in case the semiconductor chip (IC) is large in size, a minimal area of such semiconductor chip (IC) is attainable by disposing it in an output terminal region (a) 20 in FIG. 13, which is nearest to the buffer circuit 158.

In case the semiconductor chip (IC) is small in size, it may be designed to use an output terminal region (b) 21.

Additionally with this embodiment, since the output terminals (BUMP1) are disposed at part in close proximity to the center of the semiconductor chip (IC), in case the semiconductor chip (IC) is mounted on a film substrate by chip-on-film techniques, more than one wiring layer (COFA) on or over the film substrate for connection between the output terminals (BUMP1) of semiconductor chip (IC) and the drain lines (D) of the liquid crystal display panel 10 will partly overlap the semiconductor chip (IC).

Figure 14:
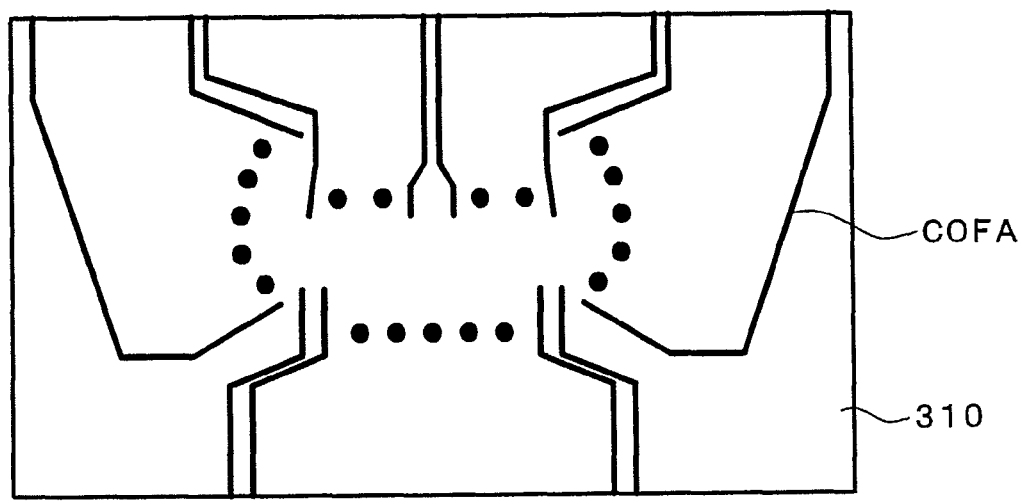
FIG. 14 is a diagram showing a layout of a wiring layer (COFA) on a film substrate in accordance with Embodiment 1 of the invention.

Due to this, with this embodiment, letting the wiring layer (COFA) overlying the film substrate have a layout such as shown in FIG. 14 makes it possible to electrically connect together the output terminals (BUMP1) of semiconductor chip (IC) and the drain lines (D) of the liquid crystal display panel 10 without causing the wiring layer (COFA) overlying film substrate 310 and the output terminals (BUMP1) of semiconductor chip (IC) to be brought into contact with each other as shown in FIG. 13.

Additionally, although it has been well known in the semiconductor memory device art to provide the terminal region at the center portion of a semiconductor chip, the reason for provision of the terminal region at the center in such semiconductor memories is in order to reduce on-chip lead delays, and is not for semiconductor chip cost reduction as in the invention as disclosed and claimed herein.

Embodiment 2)

Figure 15:
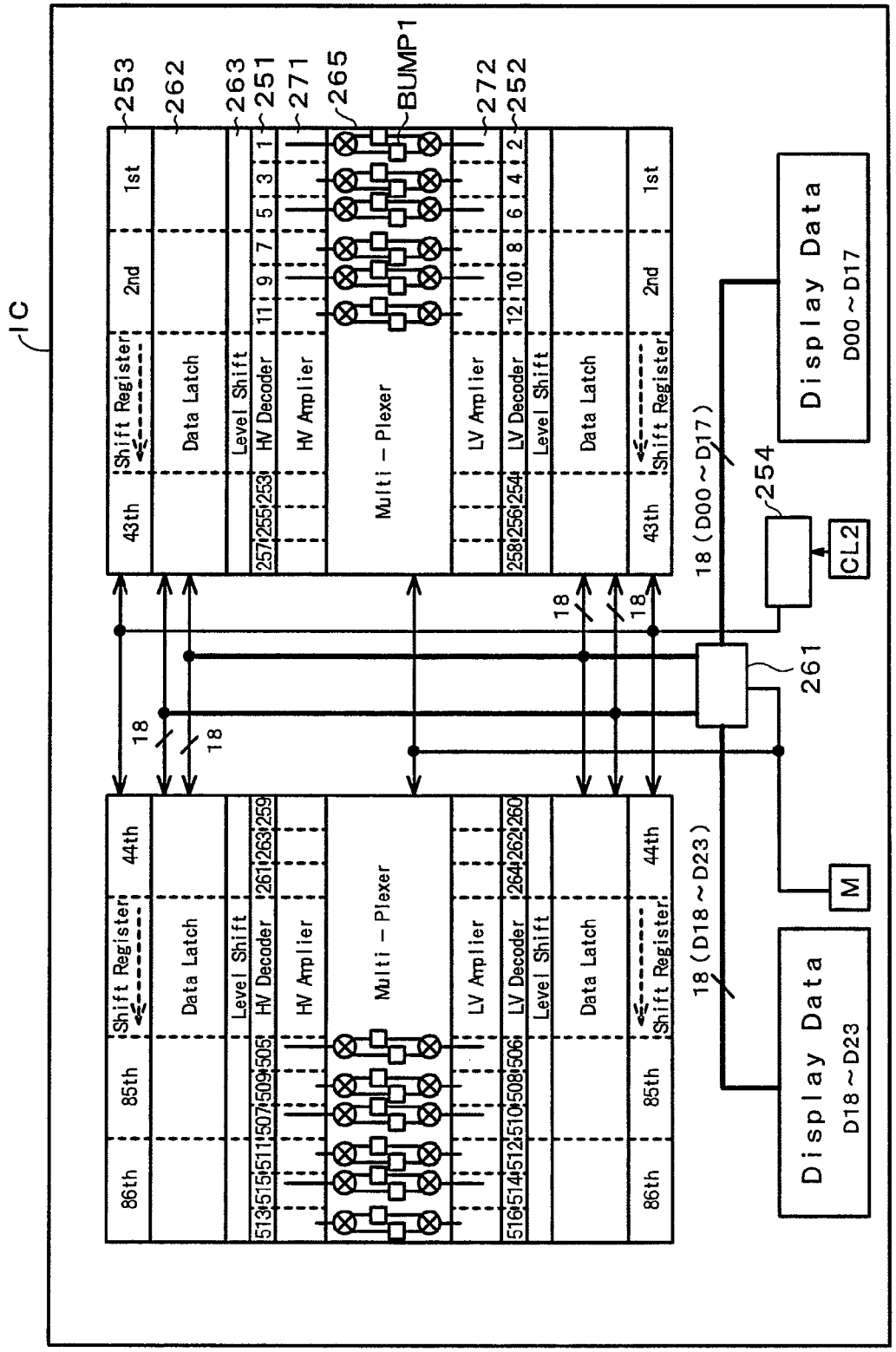
FIG. 15 is a diagram showing a layout of internal circuitry of a semiconductor chip (IC) constituting a drain driver of Embodiment 2 of the invention.

FIG. 15 is a diagram showing a layout of internal circuitry of a semiconductor chip (IC) constituting a drain driver 130 of Embodiment 2 of the invention.

This embodiment is the one which is arranged so that a respective one of the output circuit blocks which are disposed and stacked into two stages in the way as has been explained in the above-noted Embodiment 1 is separated into an output circuit block for outputting a gradation/tone voltage of the positive polarity and an output circuit block for generating a negative-polarity gradation/tone voltage.

More specifically it is separated into an output circuit block (corresponding to an upper-side output circuit block in FIG. 16, which is represented as "HV" herein) in which the decoder circuit 157 is the high-voltage decoder circuit 251 whereas the amplifier circuit 264 consists essentially of the high-voltage amplifier circuit 271 and an output circuit block (corresponding to a lower-side output circuit block in FIG. 16, which is represented as "LV" herein) in which the decoder circuit 157 is low-voltage decoder circuit 252 whereas the amp circuit 264 consists essentially of the low-voltage amplifier circuit 272.

Additionally the shift register 153 is rendered operative upon receipt of a shift clock as generated at the shift clock generator circuit 254 within clock control circuitry, wherein the shift direction of such shift register circuit 153 is indicated by dot-line arrow in FIG. 15.

In FIG. 15, numerals added to decoder circuit part correspond to output terminals (BUMP1): The FIG. 15's numerals are interchangeable in accordance with the level (H level or L level) of a polarity inversion signal (M) in such a way that No. 1 is changed to No. 2 and No. 2 is to No. 1, for example.

Due to this, with this embodiment, the shift register circuit 153 is required to output a data accept signal per every set of three output terminals (BUMP1).

Additionally, according to the above-stated embodiment, the shift register circuit 153 is designed to output the data accept signal per every set of six output terminals (BUMP1).

In this embodiment, it is possible to achieve circuit area shrink at the decoder circuit 157 that has a specified number of voltage bus lines which number is given by 64 gray-scale levels×2=128 lines and the data latch circuit unit 262 having a predetermined number of display data buses which number is given as 6 bits×6=36 lines.

Figure 16:
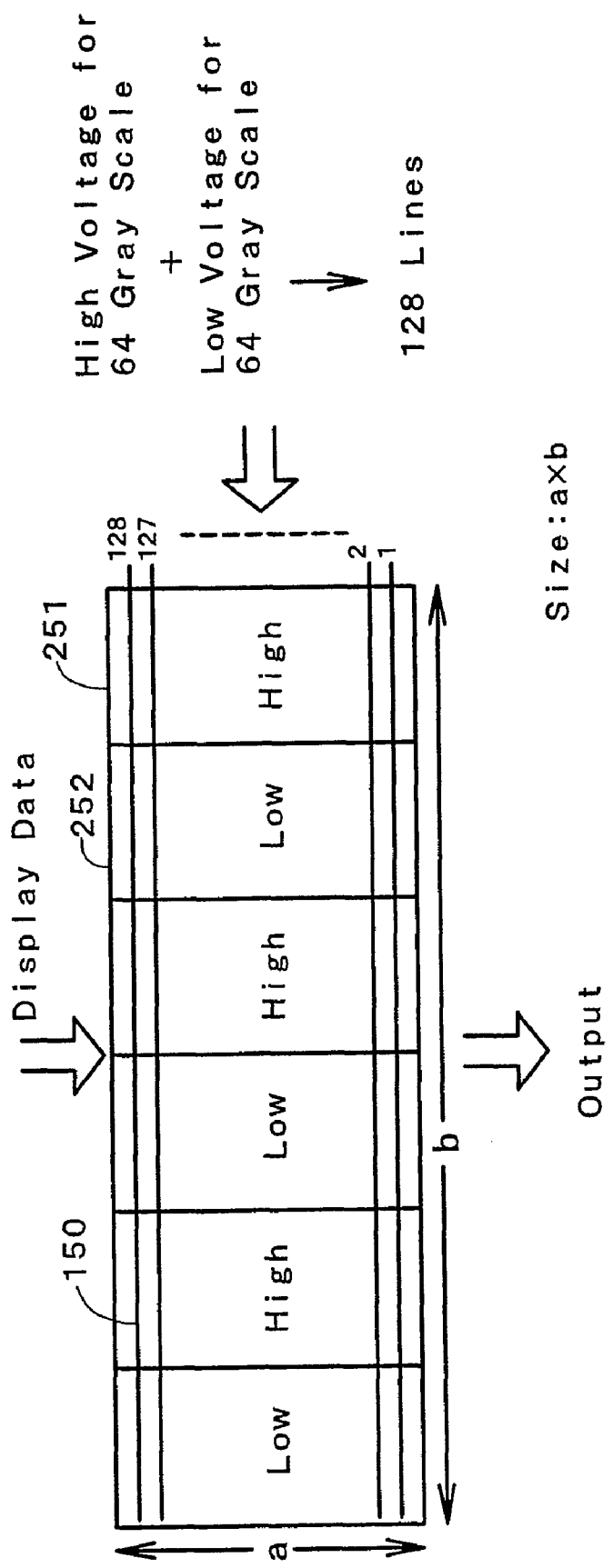
FIG. 16 is a pictorial diagram showing a structure of a related known decoder circuit within a semiconductor chip (IC)

FIG. 16 is a pictorial diagram showing the structure of a known decoder circuit 157 within a semiconductor chip (IC).

As shown in FIG. 16, conventionally the decoder circuit 157 is such that switching elements are disposed beneath a selected number, 128 in total, of aluminum wiring leads (referred to as "AL leads" hereinafter) 150 of voltage bus lines of 64 gradation levels or "gray-scales" on the low voltage side and voltage bus lines of 64 gray scales on the high voltage side.

Here, looking at the high voltage side (indicated by "High" in FIG. 16) by way of example, to-be-used ones of such 128 voltage bus lines are only 64 lines corresponding to 64 gray-scale levels on the high voltage side; thus, a space for use with the remaining 64 low-voltage-side lines is a dead region under an assumption that the size of switching element does not serve as any limitation.

The same goes with the low voltage side; hence, let an area at this time be (a×b).

Figure 17:
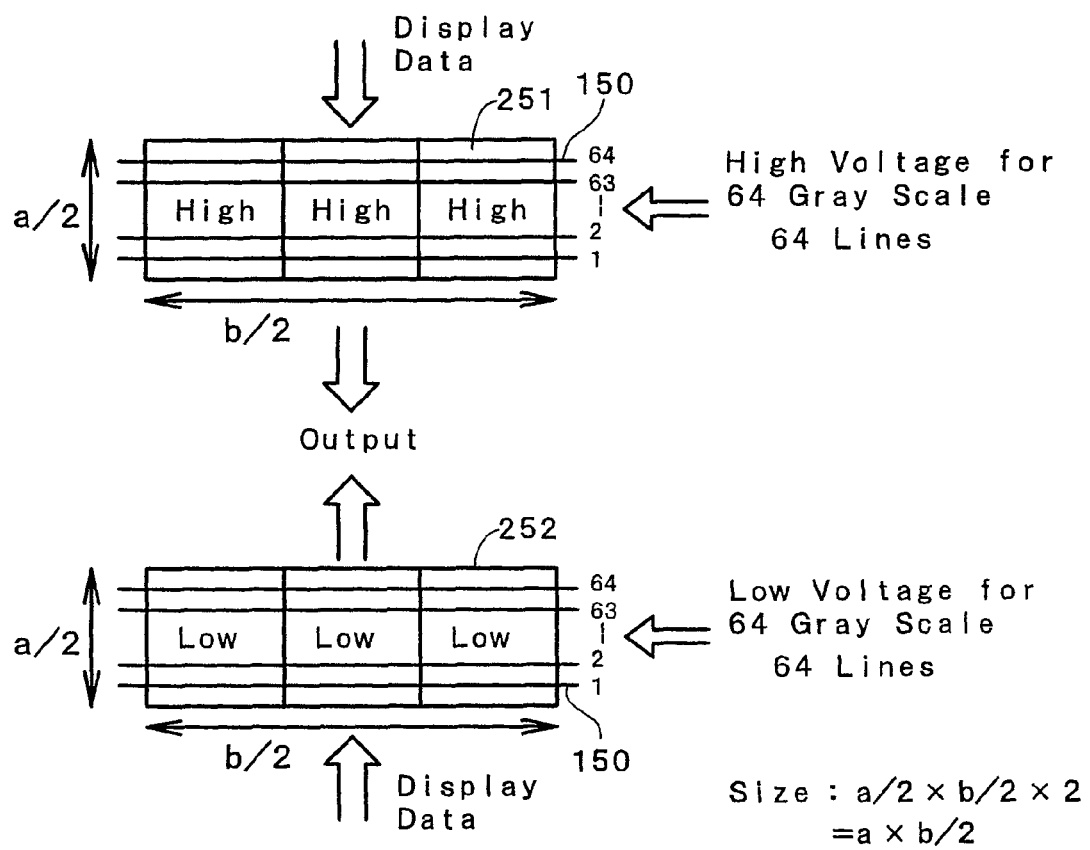
FIG. 17 is a pictorial diagram showing a structure of a decoder circuit within a semiconductor chip (IC) in accordance with Embodiment 2 of the invention.

FIG. 17 is a pictorial diagram showing a structure of the decoder circuit 157 within a semiconductor chip (IC) in accordance with this embodiment.

As shown in FIG. 17, switch elements of the high-voltage decoder 251 are disposed beneath wiring leads of 64 gray-scale levels on the high voltage side whereas switch elements of the low-voltage decoder 252 are laid out under wiring leads of 64 gray-scale levels on the low voltage side.

Due to this, with this embodiment, any dead region is no longer present unlike the related art decoder circuit 157 shown in FIG. 17.

Note here that at presently available manufacturing processes, the AL leads 150 are controlling the area in most cases so that it is sufficiently possible to dispose switch elements beneath the Al leads 150.

The area at this time is given as (a×b)/2, which becomes half (½) of the traditional decoder circuit 157 shown in FIG. 17.

In this way, with this embodiment, it is possible to reduce by half the resultant circuit area irrespective of the equality of functionality.

Even in the data latch circuit 262 also, for the identically same reason, it is possible to half-reduce the circuit area; thus, it is possible to significantly reduce an overall area of the drain driver circuitry.

(Embodiment 3)

Figure 18:
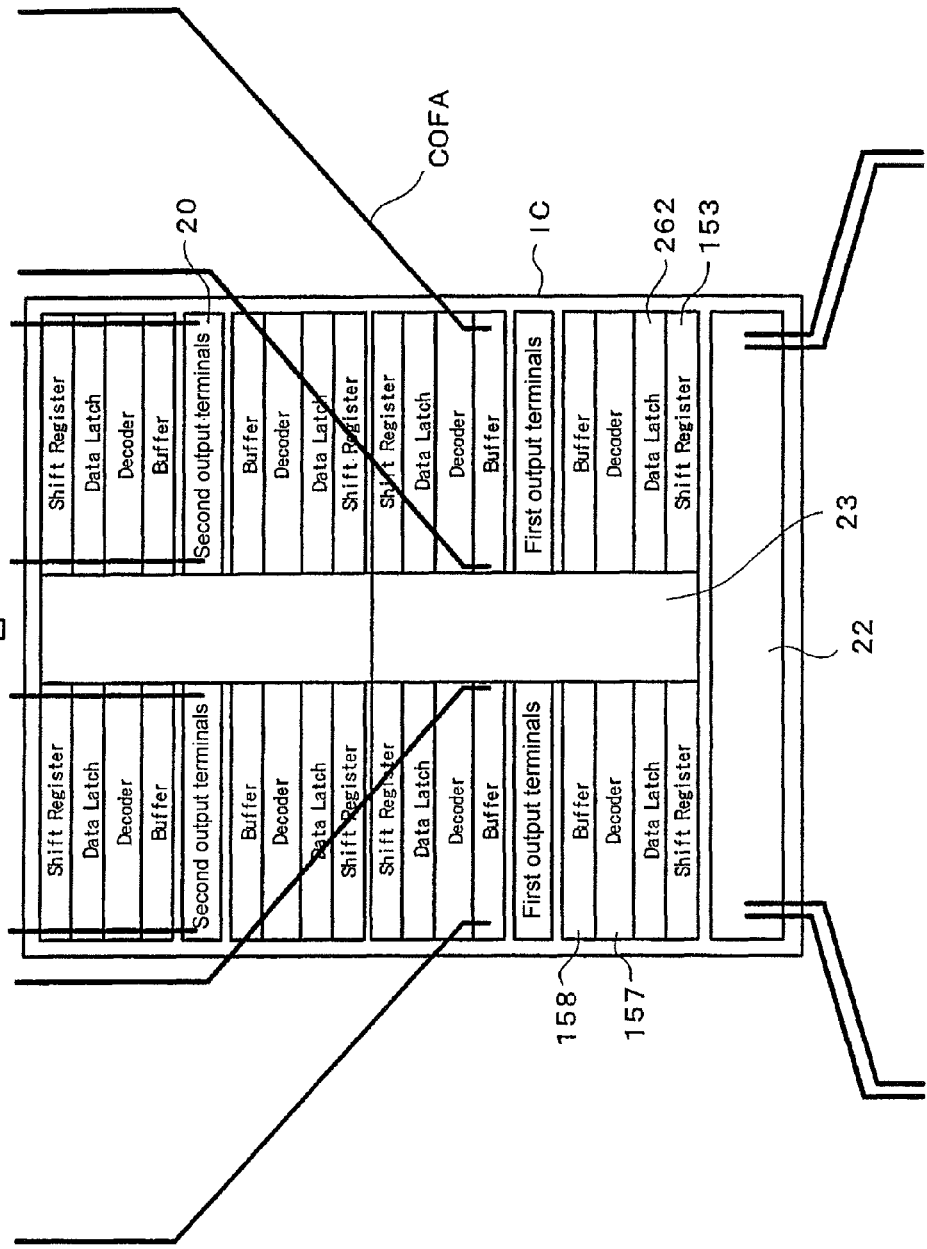
FIG. 18 is a diagram showing a layout of internal circuitry of a semiconductor chip (IC) constituting a drain driver of Embodiment 3 of the invention.

FIG. 18 is a diagram showing a layout of internal circuitry of a semiconductor chip (IC) constituting a drain driver 130 of Embodiment 3 of the invention.

This embodiment shown herein is the one which is arranged so that the output circuit blocks as have been explained in Embodiment 1 are disposed and stacked over each other into four stages.

Even with this embodiment, it is possible by disposing the output terminals (BUMP1) of the same shape in adjacent regions to reduce dead spaces to thereby reduce the area of an output terminal region 20.

Note that although in this embodiment, the area might increase by a degree corresponding to the decoder circuit 157 and data latch unit 262 when compared to the case of the two-stage arrangement of Embodiment 1 stated supra, it is possible to further reduce the length in the longitudinal direction (lateral direction).

Thus, it is possible to attain accommodation within an exposure region(s) when forming semiconductor chips (ICs) on a wafer by step-and-repeat exposure techniques with an increase in the number of output terminals.

In addition, with this embodiment, as output terminals (BUMP1) are disposed into two stages at part adjacent to a central portion of the semiconductor chip (IC), a wiring layer (COFA) overlying a film substrate for connection between the output terminals (BUMP1) of semiconductor chip (IC) and drain lines (D) of liquid crystal display panel 10 partly overlaps the semiconductor chip (IC) in case where the semiconductor chip (IC) is mounted on the film substrate by chip-on-film techniques.

Figure 19:
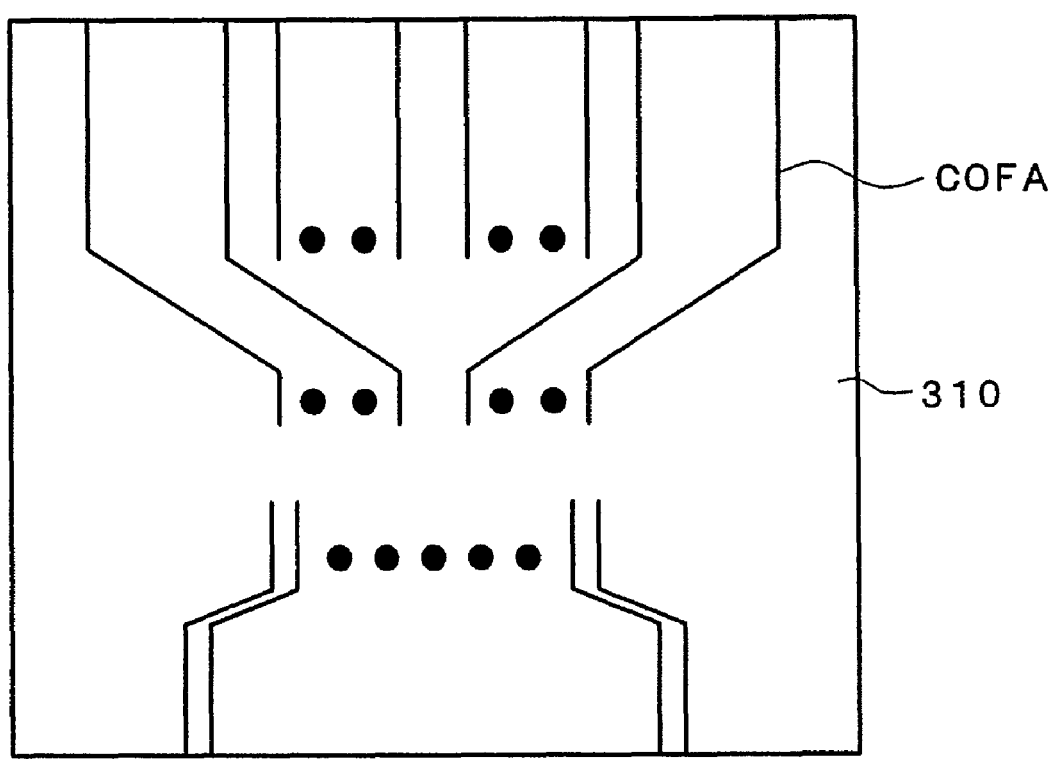
FIG. 19 is a diagram showing a layout of a wiring layer (COFA) on a film substrate of Embodiment 3 of the invention.

Due to this, with this embodiment, it is possible by letting the wiring layer (COFA) overlying the film substrate have a layout shown in FIG. 19 to electrically connect the output terminals (BUMP1) of semiconductor chip (IC) and the drain lines (D) of liquid crystal display panel 10 without causing the wiring layer (COFA) of film substrate 310 to come into contact with the terminals (BUMP1) of semiconductor chip (IC) as shown in FIG. 18.

(Embodiment 4)

Figure 20:
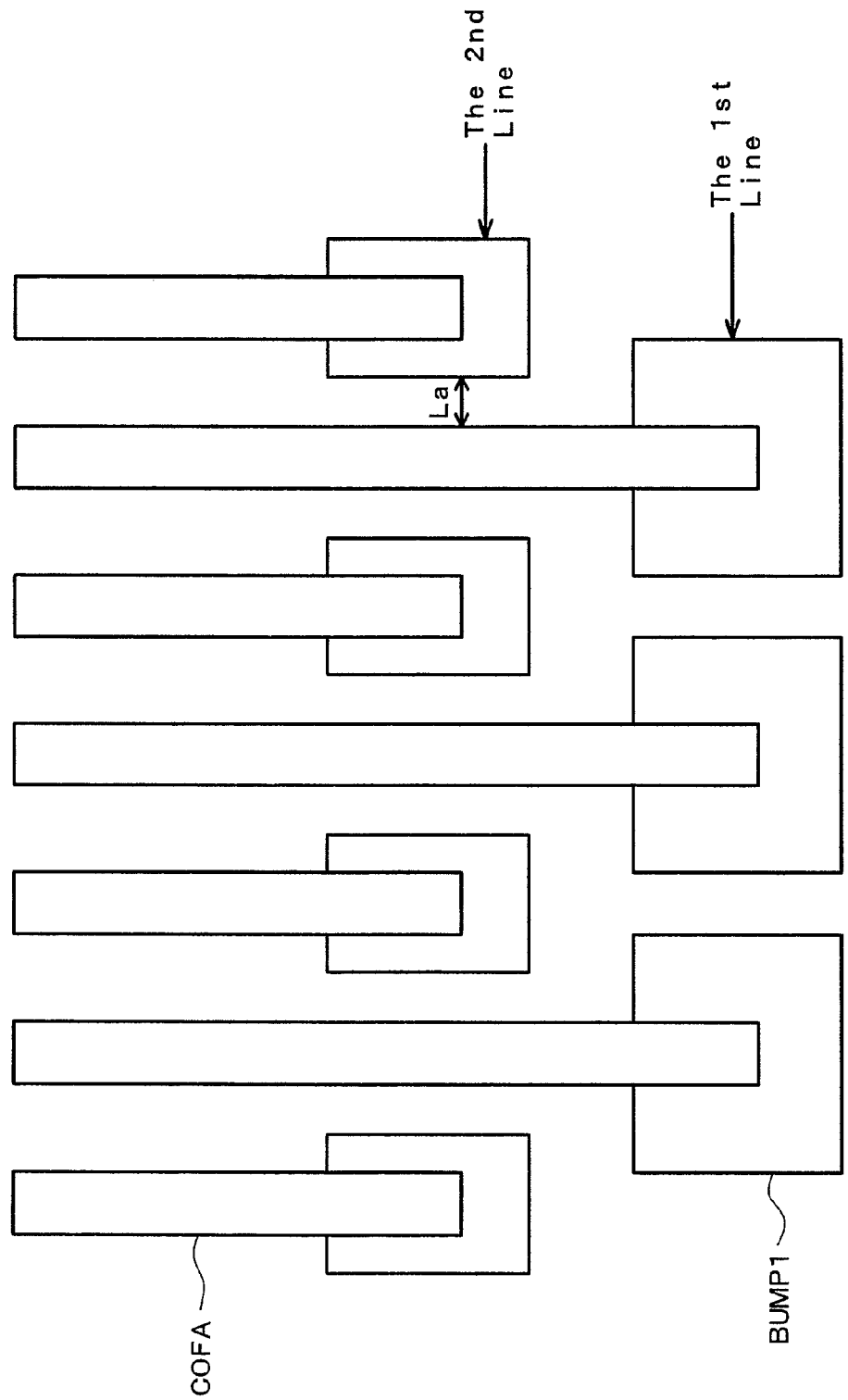
FIG. 20 is a diagram for explanation of disposal of output terminals (BUMP1) of a semiconductor chip (IC) making up a drain driver of Embodiment 4 of the invention.

FIG. 20 is a diagram for explanation of disposal of output terminals (BUMP1) of a semiconductor chip (IC) making up a drain driver 130 of Embodiment 4 of the invention.

As shown in FIG. 20, with this embodiment, output terminals (BUMP1) are formed into two separate arrays or "columns," wherein these output terminals (BUMP1) are electrically connected to drain lines (D) of liquid crystal display panel 10 by a wiring layer (COFA) with multiple leads as formed on or over a film substrate 310.

In this case, if the output terminals (BUMP1) are formed into a plurality of columns then the distance or lead pitch is narrowed of the wiring layer (COFA) formed on the film substrate 310, which leads to a likewise decrease in distance between the wiring layer (COFA) of film substrate 310 and its neighboring output terminals (BUMP1), resulting in occurrence of a disadvantage that the possibility of creation of electrical shorting defects gets higher.

Then, with this embodiment, such risks of shorting defect creation may be avoided by specifically designing the terminals (BUMP1) so that those adjacent to the lead take-out direction of the wiring layer (COFA) of film substrate 310 (i.e. the second column of terminals (BUMP1) with respect to the first column of terminals (BUMP1) in FIG. 20) are shortened in length in column direction of the output terminals (BUMP1) to thereby lengthen the distance (La of FIG. 20) between the wiring layer (COFA) of film substrate 310 and its neighboring output terminals (BUMP1).

In addition, in case probe test/inspection is carried out, problems can occur due to deviation of a probe and an output terminal (BUMP1) as the distance (pitch) of output terminals (BUMP1) becomes smaller.

Then, with this embodiment, in case probing is done for the output terminals (BUMP1) as disposed into n (N>1) stages at specified intervals each corresponding to n pins, let those output terminals (BUMP1) (first column of output terminals (BUMP1) in FIG. 15) that are disposed far from the takeout direction of the wiring layer (COFA) formed on the film substrate 310 increase in length in column direction thereof and then perform probe test/inspection at this column, thereby avoiding problems occurring due to deviation of the probe and output terminal (BUMP1) during the probe test procedure.

In this way, with this embodiment, letting those output terminals (BUMP1) (first column of output terminals (BUMP1) in FIG. 20) adjacent to the takeout direction of the wiring layer (COFA) as formed on the film substrate 310 decrease in length in the column direction makes it possible to preclude electrical shorting defects between the output terminals (BUMP1) and the wiring layer (COFA) formed on the film substrate 310 and further makes it possible to avoid upon-connection defects due to deviation between the probe and output terminal (BUMP1) during probe testing.

(Embodiment 5)

Figure 21:
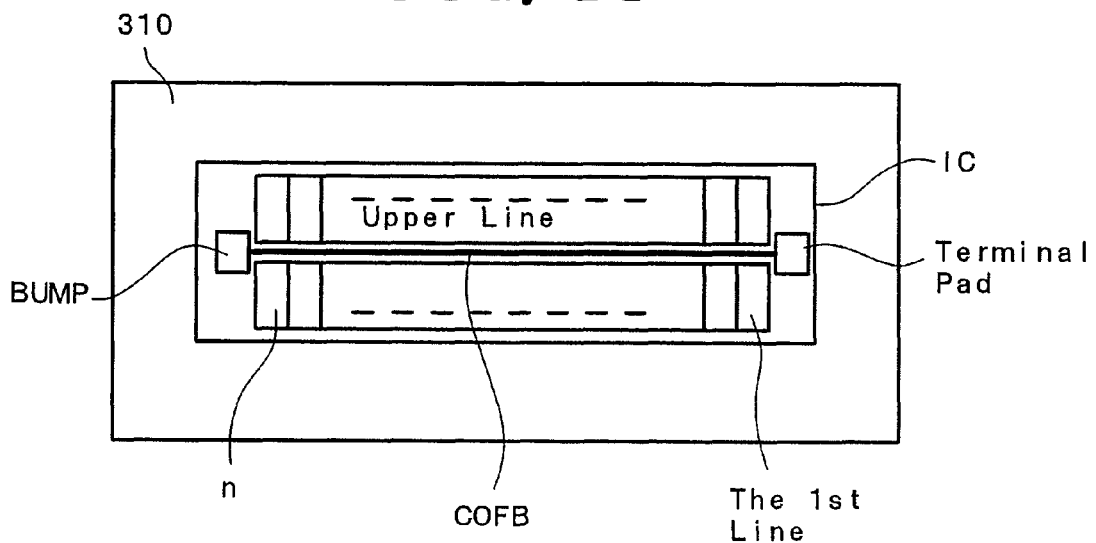
FIG. 21 is a diagram for explanation of part of a terminal (BUMP) of a semiconductor chip (IC) making up a drain driver of Embodiment 5 of the invention along with part of a wiring layer (COFB) that is formed on a film substrate.

FIG. 21 is a diagram for explanation of part of terminals (BUMP) of a semiconductor chip (IC) making up a drain driver 130 of Embodiment 5 of the invention along with part of a wiring layer (COFB) with multiple leads as formed on a film substrate 310.

The wiring layer (COFB) shown in FIG. 21 is the one that connects together the terminals (BUMP) of the semiconductor chip (IC) as mounted on the film substrate 310.

As higher precision and higher performance plus further increases in screen sizes of liquid crystal display devices are advanced, the drain driver 130 is required to offer higher performances; if this is the case, an output delay due to influence of load impedances will become problematic in power supply wiring layer(s) and clock wiring layer(s) or else within the semiconductor chip (IC) that makes up the drain driver 130.

Then, as in this embodiment, reinforcing or replacing metal wiring leads of the semiconductor chip (IC) by the wiring layer (COFB) of film substrate 310 which is low in impedance makes it possible to improve the driving ability of the drain driver 130.

Figure 22:
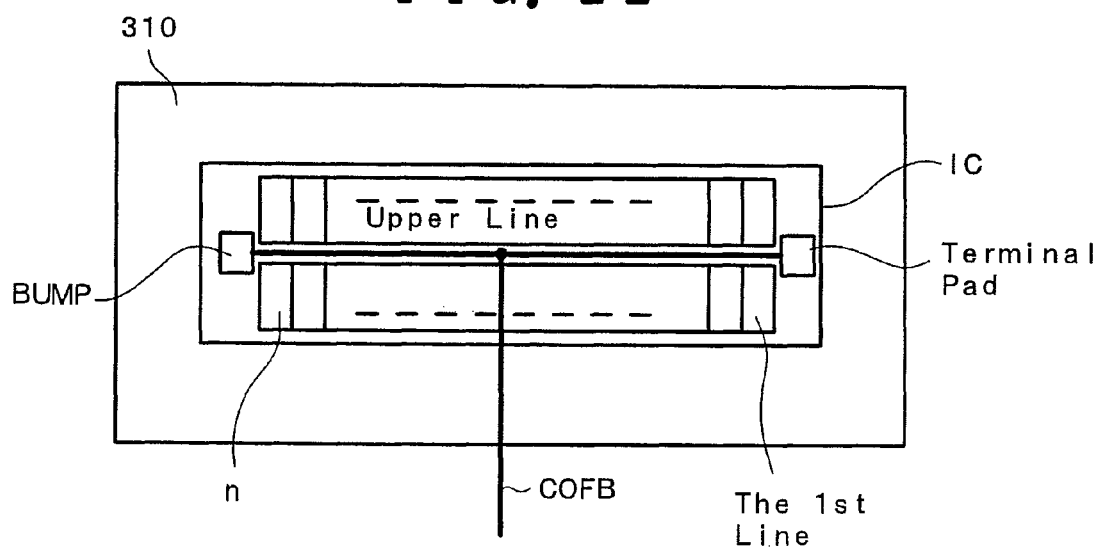
FIG. 22 is a diagram for explanation of a modified example of FIG. 21.

In addition, as shown in FIG. 22, it will also be possible to connect together a plurality of terminals (BUMP) by the same lead and further connect this wiring layer (COFB) to an input terminal(s) of a wiring layer being formed at outer periphery of the film substrate 310.

Figure 23:
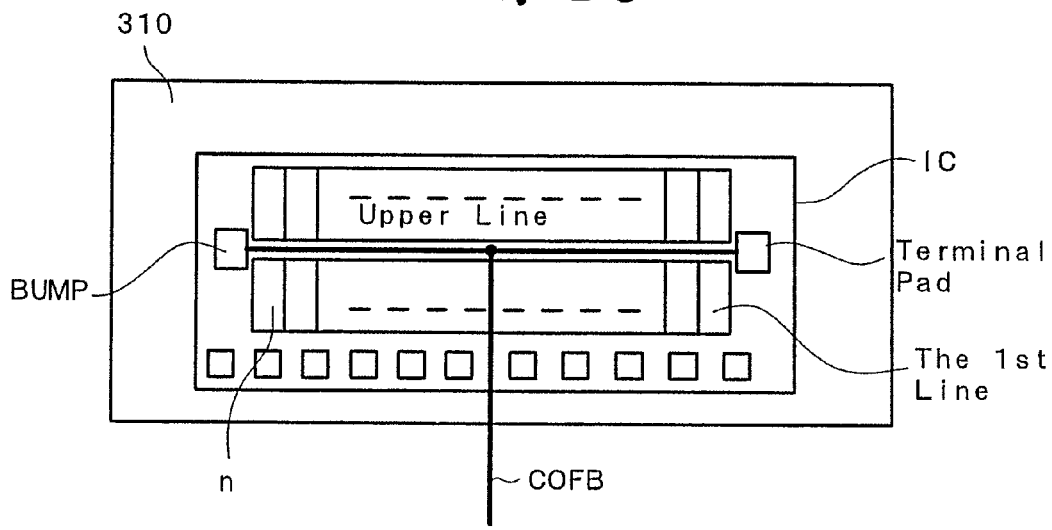
FIG. 23 is a diagram for explanation of a modification of FIG. 21.

Alternatively, as shown in FIG. 23, those terminals (BUMP) that are not able to be put at the outer periphery of the semiconductor chip (IC) are provided on the inside thereof while connecting the wiring layer (COFB) of film substrate 310 to the internally provided terminals (BUMP) being provided on the inside, thereby enabling supplement of a voltage(s) to the internally provided terminals (BUMP).

It should be noted that although in each embodiment, a specific embodiment has been stated in which the invention is applied to the liquid crystal display panel of the longitudinal electric field mode, the invention should not be limited to this and may also be applicable to liquid crystal display panels of the lateral electric field mode.

Also note that although in each embodiment, a specific one with the dot inversion scheme being applied as the driving method thereof has been explained, the invention should not be limited to this and may also be applicable to common inversion methods for inverting drive voltages as applied to the pixel electrode (ITO1) and common electrode (ITO2) in units of lines or alternatively in units of frames.

Further, the invention is also applicable to simple-matrix liquid crystal display devices.

Although the invention made by the inventor(s) as named herein has been explained in detail based on the preferred embodiments, the invention should not be limited only to the embodiments and, obviously, may be modified and altered into a variety of forms without departing from the true spirit and scope of the invention.

Effects and advantages obtainable by a representative one of the inventive concepts as disclosed herein will be explained in brief below.

(1) In accordance with the invention, it is possible to reduce costs of the liquid crystal display device.

(2) According to the invention, it is possible to simplify the liquid crystal display device test/inspection procedure.

(3) According to the invention, it is possible to prevent any unwanted voltage dropdown otherwise occurring due to wiring layers on the inside of a semiconductor integrated circuit device(s).

What is claimed:

1. A display device comprising:
   a TFT substrate comprising a plurality of gate signal lines, a plurality of drain signal lines, and a plurality of thin-film transistors connected to the plurality of gate signal lines and the plurality of drain signal lines;
   a gate driver electrically connected to the plurality of gate signal lines;
   a film substrate comprising a plurality of wirings which are electrically connected to the plurality of drain signal lines; and
   a semiconductor integrated circuit mounted on the film substrate and comprising a plurality of input terminals and a plurality of output terminals, the plurality of output terminals are connected to the plurality of wirings,
   wherein the film substrate comprises a first surface and a second surface, and the plurality of wirings and the semiconductor integrated circuit are disposed on the first surface of the film substrate,
   wherein the plurality of output terminals comprise a first group which consists of first output terminals and a second group which consists of second output terminals, and the plurality of input terminals and the first and second output terminals are arranged in parallel with a longer edge of the semiconductor integrated circuit, and
   wherein the first output terminals are disposed between the second output terminals and the plurality of input terminals.

2. A display device according to claim 1,
   wherein the semiconductor integrated circuit is configured on a semiconductor chip.

3. A display device according to claim 2,
   wherein the first output terminals are disposed at a central portion along a relatively short side direction of the semiconductor chip.

4. A display device according to claim 3,
   wherein the semiconductor integrated circuit comprises a decoder circuit and a data latch circuit disposed between the first output terminals and the second output terminals.

5. A display device according to claim 4,
   wherein the plurality of wirings comprises first wirings connected to the first output terminals, the first wirings are disposed between the semiconductor chip and the film substrate.

6. A display device according to claim 5,
   wherein a part of the first wirings are disposed between a decoder circuit of the semiconductor integrated circuit and the film substrate.

7. A display device according to claim 5,
   wherein a part of the first wirings are disposed between the first output terminals and the second output terminals.

8. A display device according to claim 2,
   wherein the semiconductor integrated circuit further comprises a first input terminal and a second input terminal, and the film substrate further comprises a second wiring on the first surface, and
   wherein the first input terminal and the second input terminal are connected by the second wiring.

9. A display device according to claim 8,
   wherein the second wiring is a power supply wiring.

10. A display device according to claim 8,
    wherein the second wiring is a clock supply wiring.

11. A display device comprising:
    a TFT substrate comprising a plurality of gate signal lines, a plurality of drain signal lines, and a plurality of thin-film transistors connected to the plurality of gate signal lines and the plurality of drain signal lines;
    a gate driver electrically connected to the plurality of gate signal lines;
    a film substrate comprising a plurality of wirings; and
    a semiconductor chip mounted on the film substrate by chip-on-film techniques and comprising a plurality of input terminals and a plurality of output terminals, the plurality of output terminals are connected to the plurality of wirings,
    wherein the film substrate comprises a first surface and a second surface, and the plurality of wirings and the semiconductor chip are disposed on the first surface,
    wherein the plurality of output terminals comprise a first group which consists of first output terminals and a second group which consists of second output terminals, and the plurality of input terminals and the first and second output terminals are arranged in parallel with a longer edge of the semiconductor chip, and
    wherein the first output terminals are disposed between the second output terminals and the plurality of input terminals, and
    wherein the plurality of wirings disposed on the first surface of the film substrate are electrically connected to the plurality of drain signal lines, and a part of the plurality of wirings overlaps the semiconductor chip.

* * * * *